United States Patent
Servais et al.

(10) Patent No.: US 12,486,759 B2
(45) Date of Patent: Dec. 2, 2025

(54) SUPERVISED MACHINE LEARNING-BASED WELLBORE CORRELATION

(71) Applicant: Landmark Graphics Corporation, Houston, TX (US)

(72) Inventors: Marc Paul Servais, Reading (GB); Graham Baines, Abingdon (GB)

(73) Assignee: Landmark Graphics Corporation, Houston, TX (US)

(*) Notice: Subject to any disclaimer, the term of this patent is extended or adjusted under 35 U.S.C. 154(b) by 41 days.

(21) Appl. No.: 17/305,861

(22) Filed: Jul. 15, 2021

(65) Prior Publication Data

US 2023/0021210 A1    Jan. 19, 2023

(51) Int. Cl.
*E21B 47/04* (2012.01)
*E21B 47/12* (2012.01)
*G06N 3/08* (2023.01)

(52) U.S. Cl.
CPC .............. *E21B 47/04* (2013.01); *E21B 47/12* (2013.01); *G06N 3/08* (2013.01); *E21B 2200/22* (2020.05)

(58) Field of Classification Search
CPC ...... E21B 47/04; E21B 47/12; E21B 2200/22; G06N 3/08
See application file for complete search history.

(56) References Cited

U.S. PATENT DOCUMENTS 11,360,233 B2 * 6/2022 Ramfjord ............ E21B 47/0025
2004/0181341 A1 9/2004 Neff et al.
2006/0052937 A1 * 3/2006 Zoraster ................. G01V 11/00
   702/6
2008/0140319 A1 6/2008 Monsen et al.
(Continued)

FOREIGN PATENT DOCUMENTS

WO    2018031051    2/2018
WO    2022146443    7/2022

OTHER PUBLICATIONS

N. A. Sidorovskaia and et al., "Some Aspects of Time-to-Depth Conversion for Depth Imaging,", Offshore Technology Conference, Houston, Texas, May 3, 1999 (Year: 1999).*

(Continued)

*Primary Examiner* — Douglas Kay
(74) *Attorney, Agent, or Firm* — DeLizio, Peacock, Lewin & Guerra LLP

(57) ABSTRACT

A method for performing wellbore correlation across multiple wellbores includes predicting a depth alignment across the wellbores based on a geological feature of the wellbores. Predicting a depth alignment includes selecting a reference wellbore, defining a control point in a reference signal of a reference well log for the reference wellbore, and generating an input tile from the reference signal, the control points, and a number of non-reference well logs corresponding to non-reference wellbores. The well logs include changes in a geological feature over a depth of a wellbore. The input tile is input into a machine-learning model to output a corresponding control point for each non-reference well log. The corresponding control point corresponds to the control point of the reference log. Based on the corresponding control points output from the machine-learning model, the non-reference well logs are aligned with the reference well log to correlate the multiple wellbores.

19 Claims, 13 Drawing Sheets

(56) References Cited

U.S. PATENT DOCUMENTS

| | | |
|---|---|---|
| 2010/0149917 A1 | 6/2010 | Imhof et al. |
| 2012/0029827 A1 | 2/2012 | Pepper et al. |
| 2013/0138351 A1 | 5/2013 | Fink et al. |
| 2014/0316706 A1 | 10/2014 | Grant et al. |
| 2015/0088424 A1 | 3/2015 | Burlakov et al. |
| 2018/0124425 A1 | 5/2018 | Van Leuven et al. |
| 2019/0169962 A1 | 6/2019 | Aqrawi et al. |
| 2019/0383965 A1 | 12/2019 | Salman et al. |
| 2020/0174149 A1* | 6/2020 | Thiruvenkatanathan ............... G01V 1/307 |
| 2020/0183047 A1 | 6/2020 | Denli et al. |
| 2020/0278465 A1 | 9/2020 | Salman et al. |
| 2021/0102457 A1 | 4/2021 | Dupont et al. |
| 2022/0099855 A1 | 3/2022 | Li et al. |
| 2022/0187496 A1* | 6/2022 | Mishchenko ............ G06T 17/20 |
| 2022/0207419 A1 | 6/2022 | Servais et al. |
| 2022/0207422 A1 | 6/2022 | Servais et al. |

OTHER PUBLICATIONS

S. Brazell and et al, "A Machine-Learning-Based Approach to Assistive Well-Log Correlation", Petrophysics, vol. 60, No. 4, Aug. 2019; pp. 469-479; 9 Figures. DOI: 10.30632/PJV60N4-2019 (Year: 2019).*

Wheeler, "Automatic and simultaneous correlation of multiple well logs", UMI, Dissertation Publishing, UMI 1589685, Published by ProQuest LLC 2015 (Year: 2015).*

B. Zhang, "Deep Machine Learning In Assisted Well Correlation Analysis", [online] retrieved on Apr. 30, 2021 <from https://slidetodoc.com/deep-machine-learning-in-assisting-well-correlation-analysis/>, 55 pages (Year: 2021).*

H. Fang and et al, "Mimicking the process of manual sequence stratigraphy well correlation", Interpretation, vol. 9, No. 3 (Aug. 2021), published ahead of production Mar. 25, 2021; published online Jun. 15, 2021 (Year: 2021).*

Evain, et al., "A Pilot Study on Convolutional Neural Networks for Motion Estimation From Ultrasound Images", IEEE Transactions on Ultrasonics, Ferroelectrics, and Frequency Control, vol. 67, Iss. 12, Dec. 2020, 9 pages.

Kawano, et al., "Neural Time Warping for Multiple Sequence Alignment", 2020 IEEE International Conference on Acoustics, Speech and Signal Processing (ICASSP), May 4-8, 2020, Barcelona, Spain, 11 pages.

Weber, et al., "Diffeomorphic Temporal Alignment Nets", 33rd Conference on Neural Information Processing Systems (NeurIPS 2019), Vancouver, Canada, 12 pages.

Wheeler, "Automatic and Simultaneous Correlation of Multiple Well Logs", [online] retrieved on Apr. 30, 2021 from <https://mountainscholar.org/bitstream/handle/11124/17145/Wheeler_mines_0052N_10703.pdf?sequence=1>, 2015, 48 pages.

Zhang, "Deep Machine Learning In Assisted Well Correlation Analysis", [online] retrieved on Apr. 30, 2021 <from https://slidetodoc.com/deep-machine-learning-in-assisting-well-correlation-analysis/>, 55 pages.

"PCT Application No. PCT/US2021/070891, International Search Report and Written Opinion", Apr. 13, 2022, 9 pages.

"PCT Application No. PCT/US2020/067707 International Search Report and Written Opinion", Sep. 9, 2021, 9 pages.

Brazell, et al., "A Machine-Learning-Based Approach to Assistive Well-Log Correlation", Petrophysics, vol. 60, No. 4, Aug. 1, 2019, 10 pages.

"U.S. Appl. No. 17/138,892 Non-Final Office Action", Dec. 4, 2023, 45 pages.

Bui, et al., "Carbon Capture and Storage (CCS): the way forwrad", Energy& Environmental Science, 11 (5), 2018, 18 pages.

Kennett, et al., "Tracking Earthquake Source Evolution in 3-D", Geophysical Journal International, 2017, 13 pages.

"U.S. Appl. No. 17/138,892 Non-Final Office Action", Jul. 17, 2024, 45 pages.

"U.S. Appl. No. 17/207,358 Non-Final Office Action", Jul. 17, 2024, 45 pages.

\* cited by examiner

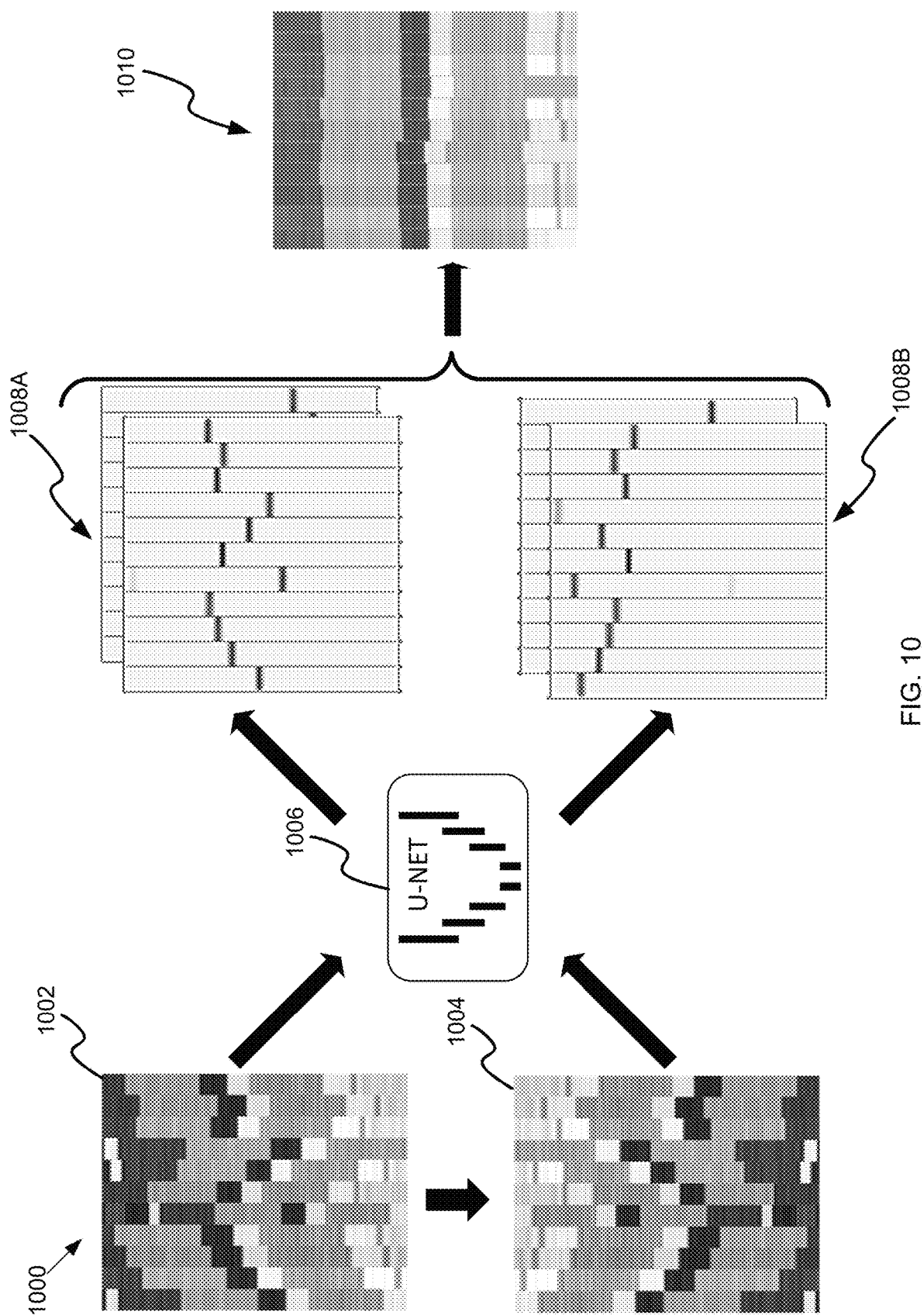

SUPERVISED MACHINE LEARNING-BASED WELLBORE CORRELATION

TECHNICAL FIELD

The disclosure generally relates to the field of wellbore formation analysis and, more particularly, to aligning wellbore log data across multiple wellbores.

BACKGROUND

Well-to-well log correlation is often performed to determine a consistency or change between patterns or signatures in well log data measured from sub-surface geological formations. A well log may be a visual representation of a measurement of a property of a formation surrounding a wellbore plotted against a depth of the wellbore. Well log data from multiple wells can be evaluated to determine corresponding depths within each well at which the surrounding formation shares a similar formation property.

BRIEF DESCRIPTION OF THE DRAWINGS

Embodiments of the disclosure may be better understood by referencing the accompanying drawings.

FIG. 10 depicts an example prediction workflow employing a machine-learning model for performing well correlation, according to some embodiments.

DESCRIPTION OF EMBODIMENTS

Figure 1:
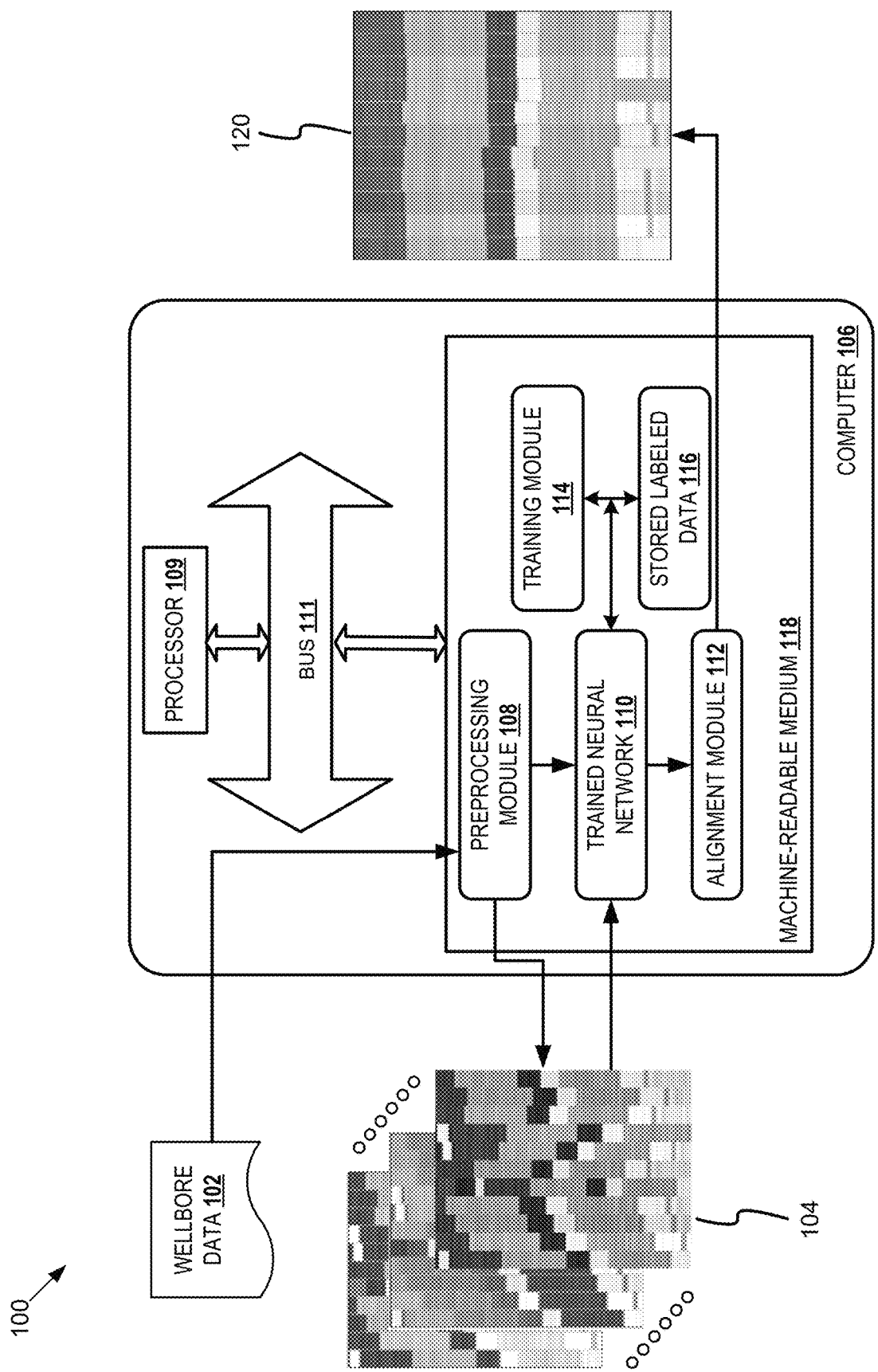
FIG. 1 depicts an example system for performing well correlation across multiple wellbores using a machine-learning model, according to some embodiments.

The description that follows includes example systems, methods, techniques, and program flows that embody embodiments of the disclosure. However, it is understood that this disclosure may be practiced without these specific details. For instance, this disclosure refers to multiple signal alignment for well correlation in illustrative examples. Embodiments of this disclosure can be also applied to data sets of multi-channel systems for signal alignment. In other instances, well-known instruction instances, protocols, structures and techniques have not been shown in detail in order not to obfuscate the description.

Data gathered from drilling a wellbore and performing other downhole operations can be interpreted to evaluate a property of a formation surrounding the wellbore at a given depth. The formation property can be mapped across a depth of the wellbore to create a well log. Multiple well logs can be generated from a single wellbore, where each well log represents a different property of the formation. Well correlation can include aligning well logs of multiple wellbores to determine depths within each wellbore that corresponds to a certain formation property. Well correlation is often performed by aligning pairs of digital signals representing the well logs of two wellbores. However, conventional approaches for aligning signals are limited in the number of signals (i.e., number of wellbores being correlated) and number of well logs for each wellbore that can be aligned at once.

Conventional approaches to aligning digital signals can be slow, particularly when applied to multiple signals. For example, Dynamic Time Warping (DTW) can align pairs of signals. To align well logs across more than two wellbores, DTW can be inefficient, as DTW correlates depths across only two wellbores at a time. Further, many signal alignment methods cannot efficiently process multi-channel data (i.e. multiple well logs for a single well). This can further hamper the computing efficiency of large amounts of data, as processing time increases with each additional well log and wellbore data set.

In addition, conventional alignment approaches are not capable of handling null or missing data. Null or missing data can be present when wellbores have differing depths or types of data sets. An inability to process well logs having null data can severely limit the ability to perform well correlation between wellbores in which differing operations and/or measurements were performed. While it may be possible to align some well logs of a wellbore with those of other wellbores, large amounts of data may not be processed in cases where a data set for a wellbore may have null or missing data in one or more well logs.

In example embodiments, a machine-learning (ML) model can be trained to perform assisted well correlation (AWC) by aligning sets of well signals including greater than two signals and/or one channel. For instance, example embodiments can perform well correlation for 20 different wellbores for four different formation properties (e.g., porosity, resistivity, permeability, and temperature) in each of the 20 different wellbores. Each formation property can correspond to a channel for a given wellbore. Therefore, in this example, there would be four channels for each of the four different formation properties for each of the 20 different wellbores. An input array can be generated by combining signals representing well data from multiple wellbores. The input array can be represented visually as an input tile, where signals of the input array are represented in heatmap format. One or more control points can be defined at fixed depths for a reference signal of the input array in order to determine corresponding depths within other wellbores of the input array where properties of the wellbore are the same or similar.

The input tile can be input into a trained ML model to generate control point mappings. The control point mappings can indicate positions within signals of the input array that correspond to the control points of the reference signal. A probability can be associated with each control point of the control point mappings. Control point mappings generated by the ML model can be used to determine a set of shifts for signals of the input array relative to the reference signal. The signals of the input array can then be aligned based on the set of shifts.

The ML model can be trained based on input arrays that include a set of transformed signals. The transformed signals can be generated based on a single original signal representing well data from a single wellbore. One or more control points can be defined for the original signal. When the original signal is transformed, locations of the control points within the transformed signals are known. A set of control point mappings can be generated from the transformed signals, and the control point mappings and corresponding input tile can be used to train the ML model.

Example System

FIG. 1 depicts an example system for performing well correlation across multiple wellbores using a machine-learning model, according to some embodiments. An example system 100 for performing well correlation across multiple wellbores can include multiple modules stored on a machine-readable medium 118 of a computer 106. The computer 106 can also include a processor 109 and a bus 111. The multiple modules (that include a preprocessing module 108, a trained neural network 110, an alignment module 112, a training module 114) can be executed by the processor 109.

Wellbore data 102 can be input into the preprocessing module 108 of the computer 106 to generate an input array 104 representing the wellbore data 102. The wellbore data 102 can include any data collected relating to a wellbore for a plurality of wellbores. The wellbore data 102 can include wireline data and/or seismic data. Example types of wellbore data can include formation type, porosity, density, gamma ray data, acoustic data, and/or any data characterizing a formation surrounding the wellbore. The wellbore data 102 can be data collected across a range of depths within a wellbore where the collected data is associated with a depth at which it was collected. Wellbore data from a given wellbore can be represented as one or more signals within the input array 104.

An input tile can represent the input array 104, where the input tile is to be input into the trained neural network 110 to determine correlated locations across wellbores of the wellbore data 102. The training module 114 can aid in unsupervised learning based on stored labeled data 116. The trained neural network 110 can be trained based on transformed signals representing data from one or more wellbores.

Figure 2:
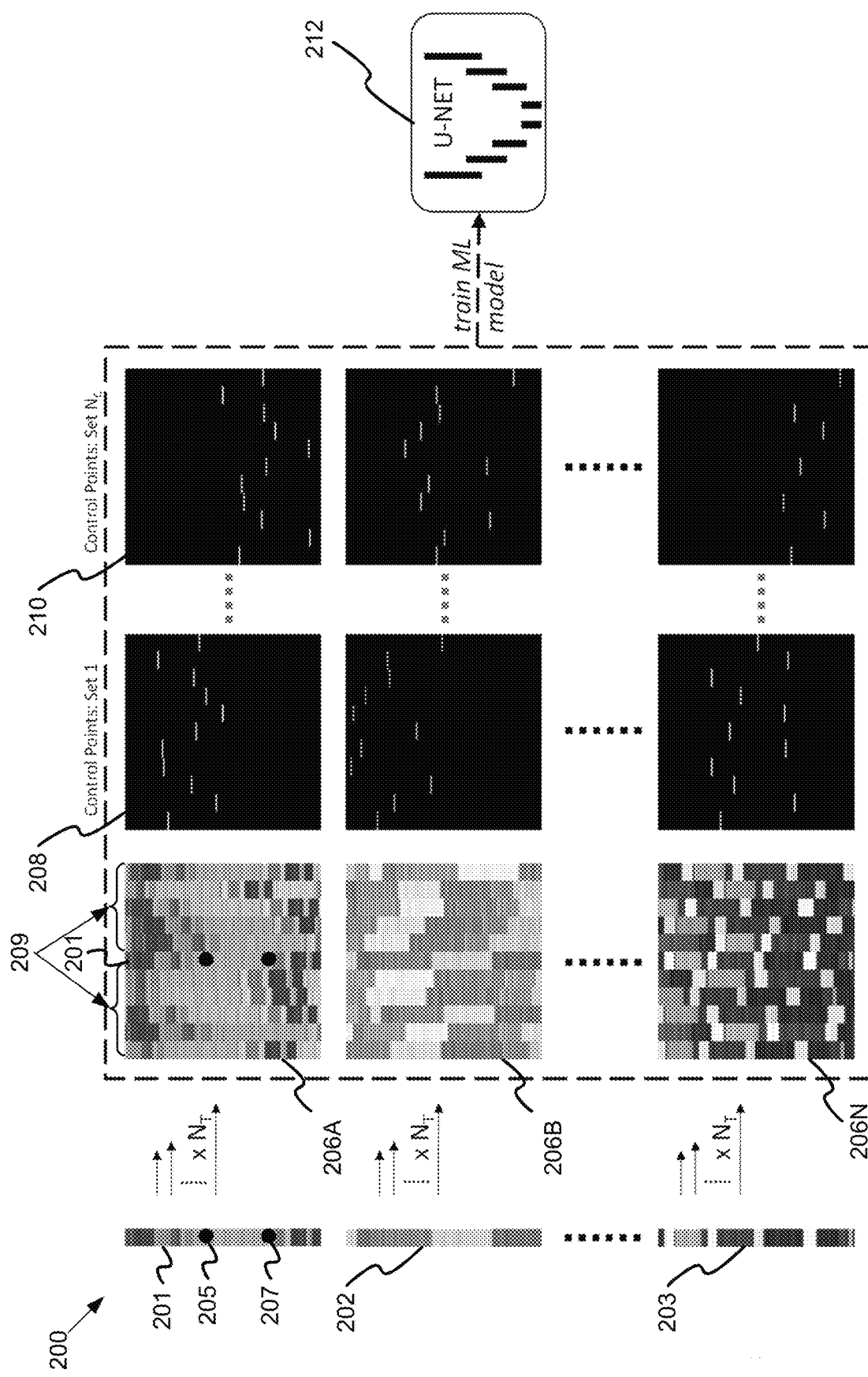
FIG. 2 depicts an example training workflow for training a machine-learning model for assisted well correlation (AWC), according to some embodiments.

To help illustrate, FIG. 2 depicts an example training workflow for training a machine-learning model for assisted well correlation (AWC), according to some embodiments. FIG. 2 depicts a training workflow 200 for training a neural network 212 to perform assisted well correlation (AWC). The neural network 212 may be an untrained U-NET. FIG. 2 depicts three signals, signal 201, signal 202, and signal 203. Each of the signals 201-203 can include well data from distinct wellbores. One or more control points can be defined at a fixed position within a signal, where the position of a control point indicates a depth at which wellbore data represented by the signal was collected. FIG. 2 depicts an upper control point 205 and a lower control point 207 defined for the signal 201. The upper control point 205 can correspond to a first depth within the wellbore and the lower control point 207 can correspond to a second depth within the wellbore. Positioning of control points is described in more detail below in reference to FIG. 3.

Once the control points for a signal are defined, the signal can be transformed to generate a number of input signals, $N_T$, for training the neural network 212. A signal can be transformed by one or more of the following operations: (1) shifting the signal, (2) scaling the signal, (3) adjusting (increasing and/or decreasing) an amplitude of the signal, (4) adding noise to the signal, (5) setting some signal values to null values, etc.

The transformed signals representing well data from a single wellbore can be compiled to create an input tile. For example, transforms of the signal 201 can be processed to create an input tile 206. Positions of control points within the transformed signals are also combined to create at least one set of control points for each input tile. FIG. 2 depicts example input tiles for each of the signals 201, 202, and 203. As the neural network 212 can be a U-NET, the input tiles can have a height and a width such that an aspect ratio of the input tile is approximately one.

Corresponding set(s) of control points can be generated for each signal. In some embodiments, multiple control points may be identified in a well signal. In such cases, each signal will have a set of control points for each control point defined in the original signal. For example, an upper and lower control point can be defined at fixed positions within the signal 201, and a first set of control points 208 and a second set of control points 210 can be generated with the input tile 206. The first set of control point 208 can correspond to the upper control point 205 and the second set of control points 210 can correspond to the lower control point 207. Because the control points for a given signal are defined at a fixed position within the untransformed signal, positions of the control points within the transformed signals are known. The input tiles and sets of control points can then be used to train the neural network 212.

Returning to FIG. 1, dimensions of the input array 104 can be determined based on a type of the trained neural network 110. For example, the trained neural network 110 may be a UNET that requires an input tile having a set number of rows and a number of columns such that an aspect ratio of the input tile is approximately one. The dimensions of the input array can include a height, a width, and a number of channels and can be based on how the trained neural network 110 is trained.

The height of the input array 104 can be a number of samples, $N_d$, of a signal for a given wellbore. The number of samples can be equal to a number of rows required by the trained neural network 110. If the number of samples for a signal is not equal to the number of rows required by the trained neural network 110, the signals can be scaled such that the number of samples equals the number of rows required. For example, if the number of samples is less than the number of rows required by the trained neural network 110, the signal can be stretched. If the number of samples of a signal is greater than the number of rows required by the trained neural network 110, the signal can be compressed. Alternatively, a segment of the signal having the number of rows required by the trained neural network 110 can be selected.

The width of the input array 104 can be adjusted to make the aspect ratio of the input array 104 approximately equal to one. Each signal can be repeated a number of times in a horizontal dimension of the input array 104 to make the input array more "square" (i.e. aspect ratio closer to one). The width of the input array can be defined by Equation 1:

$$\text{Width} = N_T * W \quad (1)$$

where $N_T$ is a total number of input signals and w is an integer representing the number of times each signal is repeated in the horizontal dimension of the input array 104. If the total number of input signals is less than a number of input signals required by the trained neural network 110, one or more of the input signals can be repeated until $N_T$ is equal to a number of signals to be taken as input by the trained neural network 110.

The number of channels, $N_L$, of the input array 104 can be a number of well logs for a wellbore when a signal represents well data. In some embodiments, the input array 104 can include multiple well logs (or components) for one or more of the wellbores from which the wellbore data 102 was collected. Examples described herein generally refer to three channels/well logs, as it allows for signals to be easily visualized as a color (RGB) image.

Figure 3:
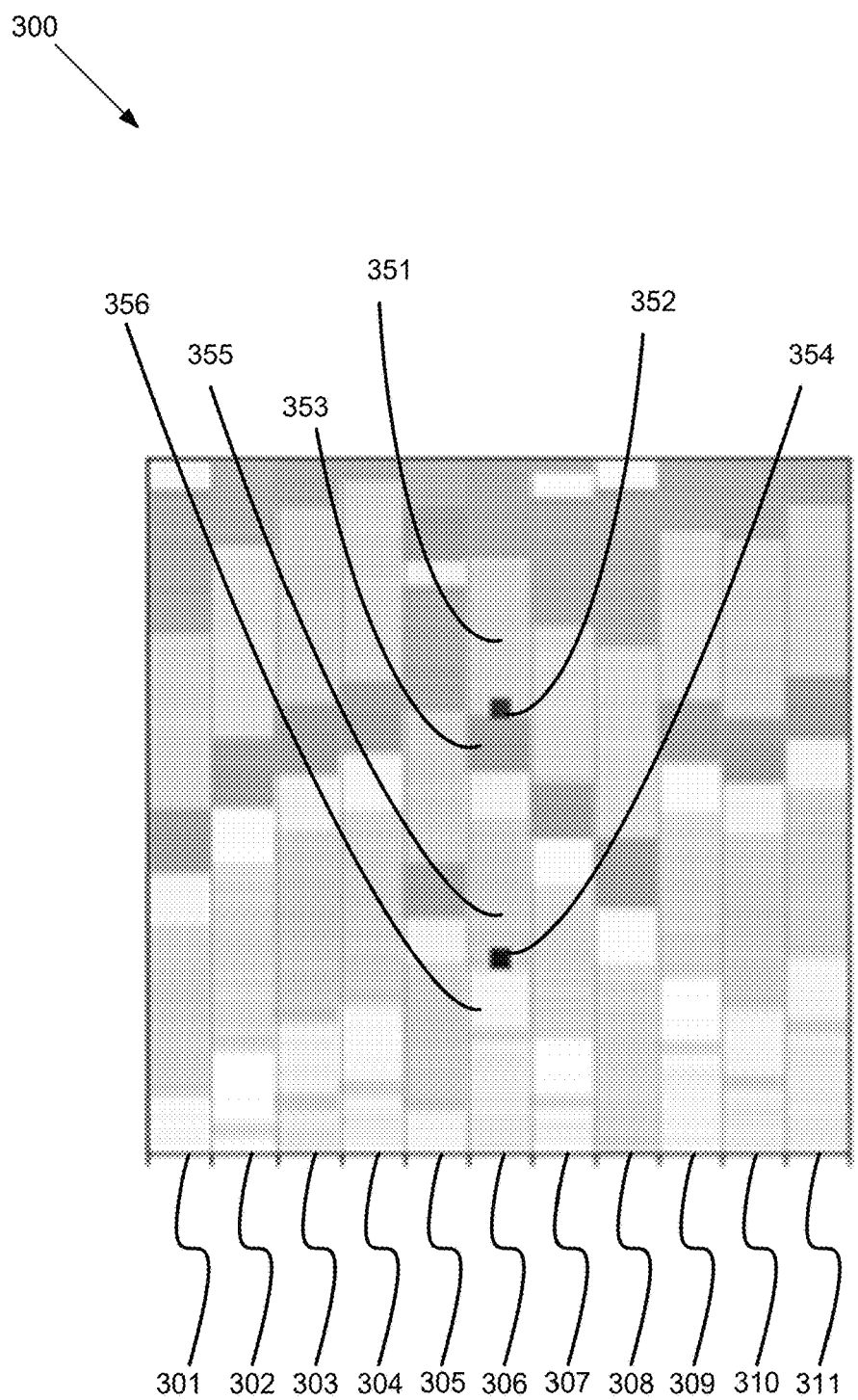
FIG. 3 depicts an example input tile to a machine-learning model for well correlation, according to some embodiments.

To help illustrate, FIG. 3 depicts an example input tile to a machine-learning model for well correlation, according to some embodiments. An input tile 300 can include multiple signals 301-311 that represent wellbore data. Each of the signals 301-311 can represent wellbore data from distinct wellbores. FIG. 3 depicts 11 signals. Thus, the signal 301 (depicted as a first column of the input tile 300) can correspond to a first wellbore, the signal 302 (depicted as a second column of the input tile 300) can correspond to a second wellbore, the signal 303 (depicted as a third column of the input tile 300) can correspond to a third wellbore, the signal 304 (depicted as a fourth column of the input tile 300) can correspond to a fourth wellbore, the signal 305 (depicted as a fifth column of the input tile 300) can correspond to a fifth wellbore, the signal 306 (depicted as a sixth column of the input tile 300) can correspond to a sixth wellbore, the signal 307 (depicted as a third column of the input tile 300) can correspond to a seventh wellbore, the signal 308 (depicted as an eighth column of the input tile 300) can correspond to an eighth wellbore, the signal 309 (depicted as a ninth column of the input tile 300) can correspond to a ninth wellbore, the signal 310 (depicted as a tenth column of the input tile 300) can correspond to a tenth wellbore, and the signal 311 (depicted as an eleventh column of the input tile 300) can correspond to an eleventh wellbore.

Upper and lower control points 352 and 354, respectively, can be defined for a reference signal (here, the signal 306). While FIG. 3 depicts the reference signal as the signal 306, any of the signals 301-311 can be selected as the reference signal. Further, FIG. 3 depicts two control points. However, in some embodiments, a greater or lesser number of control points may be defined for a reference signal. A greater number of control points can result in an increased confidence in corresponding control points output by a trained neural network.

In some embodiments, the control points 352 and 354 can be positioned where there is a visual change in the reference signal 306. For example, the input tile 300 depicts the reference signal (signal 306) as having a change in intensity of color of the input tile 300 between a first portion 351 of the signal 306 and a second portion 353 of the signal 306, and a third portion 355 of the signal 306 and a fourth portion 356 of the signal 306. The upper control point 352 can be defined at a first depth where the first portion 351 and the second portion 353 meet, and the lower control point 354 can be defined at a second depth where the third portion 355 and the fourth portion 356 meet. Alternatively, the control points 352 and 354 can be defined at fixed and pre-determined locations within the reference signal 306.

The input tile 300 can be a visual representation of an input array having multiple well logs/channels. An intensity of a color of a signal can be correlated to a strength of the signal. Each of the signals 301-311 can represent wellbore data of multiple types. In some embodiments, each channel can be assigned a color (i.e. red, green, or blue) and signals of the input tile 300 can be colored and represented as an RGB image. Thus, the coloring and intensity of a signal can represent wellbore data from the multiple well logs that make up an input array.

Figure 4:
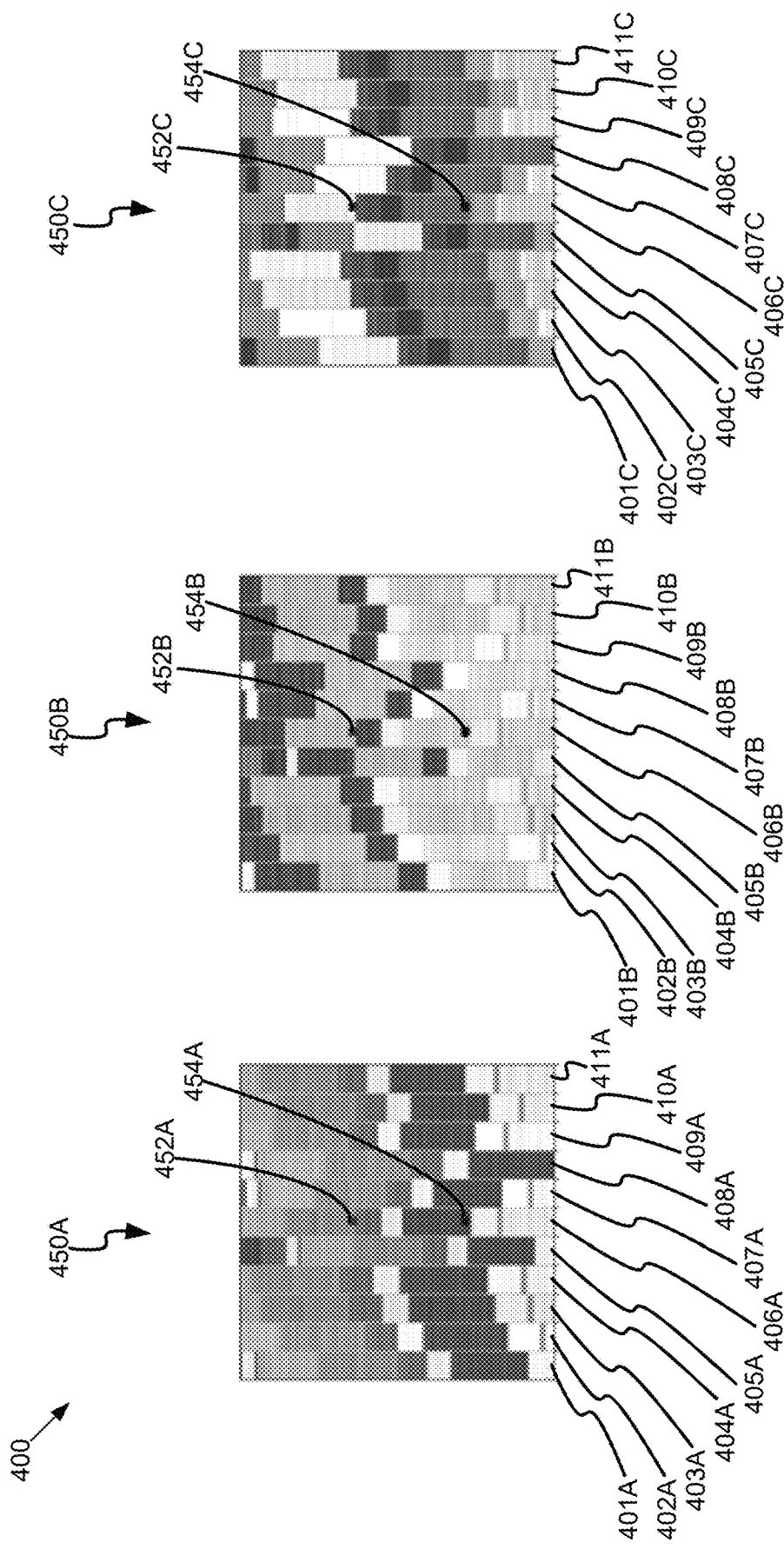
FIG. 4 depicts an example input array having multiple channels for well correlation, according to some embodiments.

To help illustrate, FIG. 4 depicts an example input array having multiple channels for well correlation, according to some embodiments. An input array 400 can include well logs 450A, 450B, and 450C for a number of wellbores. As depicted in FIG. 4, the input array 400 includes wellbore data for 11 wellbores. Each well log includes 11 signals—the well log 450A includes signals 401A-411A, the well log 450B includes signals 401B-411B, and the well log 450C includes signals 401C-411C.

Each wellbore's data is represented as a signal in each well log. Thus, the signals 401A, 401B, and 401C, depicted as first columns of the well logs 450A, 450B, and 450C, respectively, correspond to a first wellbore. The signals 402A, 402B, and 402C, depicted as second columns of the well logs 450A, 450B, and 450C, respectively, correspond to a second wellbore. The signals 403A, 403B, and 403C, depicted as third columns of the well logs 450A, 450B, and 450C, respectively, correspond to a third wellbore. The signals 404A, 404B, and 404C, depicted as fourth columns of the well logs 450A, 450B, and 450C, respectively, correspond to a fourth wellbore. The signals 405A, 405B, and 405C, depicted as fifth columns of the well logs 450A, 450B, and 450C, respectively, correspond to a fifth wellbore. The signals 406A, 406B, and 406C, depicted as sixth columns of the well logs 450A, 450B, and 450C, respectively, correspond to a sixth wellbore. The signals 407A, 407B, and 407C, depicted as seventh columns of the well logs 450A, 450B, and 450C, respectively, correspond to a seventh wellbore. The signals 408A, 408B, and 408C, depicted as eighth columns of the well logs 450A, 450B, and 450C, respectively, correspond to an eighth wellbore. The signals 409A, 409B, and 409C, depicted as ninth columns of the well logs 450A, 450B, and 450C, respectively, correspond to a ninth wellbore. The signals 410A, 410B, and 410C, depicted as tenth columns of the well logs 450A, 450B, and 450C, respectively, correspond to a tenth wellbore. The signals 411A, 411B, and 411C, depicted as eleventh columns of the well logs 450A, 450B, and 450C, respectively, correspond to an eleventh wellbore. While FIG. 4 depicts the signals 401A-411A, 401B-411B, and 401C-411C as representing distinct wellbores, in some embodiments, one or more signals may be repeated (and thus one or more signals of the input array 400 may correspond to the same wellbore).

A given signal represents how a given formation property changes over a depth of the wellbore. In particular, the highest point in the column for a given signal can correspond to a value of a formation property at a location that is closest to a surface of the wellbore. Thus, the different shading along a column represents different values of the formation property of the wellbore. Each well log can contain different wellbore data. For example, the well log 450A can contain data relating to porosity for each wellbore, the well log 450B can contain data relating to formation density for each wellbore, and the well log 450C can contain data relating to gamma ray measurements for each wellbore. Thus, the signal 401A can represent porosity, the signal 401B can represent formation density, and the signal 401C can represent gamma ray data for the first wellbore. An intensity (i.e. brightness) of a signal in the well logs 450A, 450B, and 450C can be proportional to an amplitude of the signal.

Control points corresponding to locations of control points defined for a reference signal of an input tile can be defined across the well logs 450A, 450B, and 450C at the same depth of the control points defined for the input tile. For the well log 450A, an upper control point 452A and a lower control point 454A can be defined at the first and second depths, respectively, within the signal 406A. For the well log 450B, an upper control point 452B and a lower control point 454B can be defined at the first and second depths, respectively, within the signal 406B. For the well log 450C, an upper control point 452C and a lower control point 454C can be defined at the first and second depths, respectively, within the signal 406C.

Figure 5:
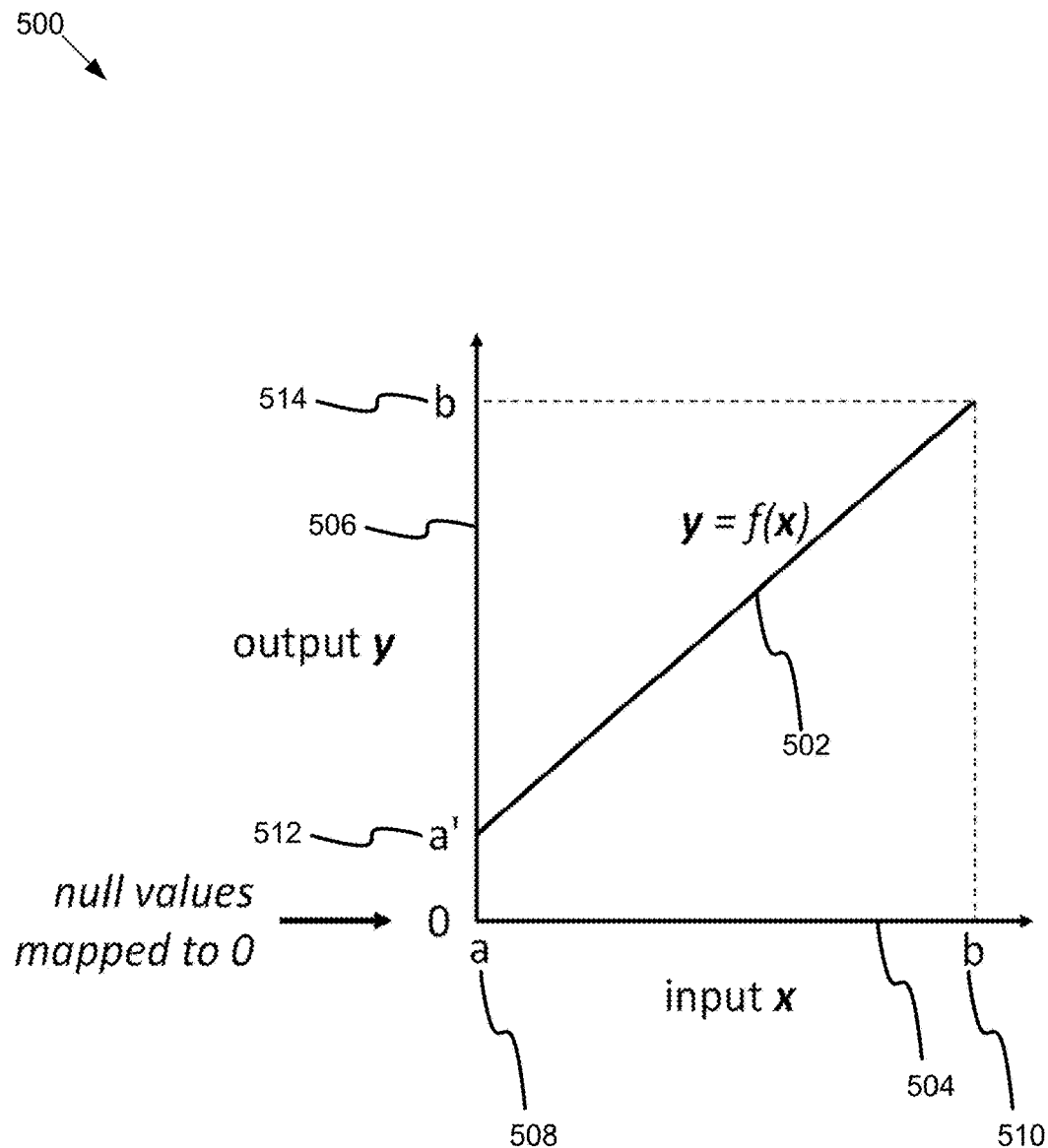
FIG. 5 depicts a graph of an example transform for representing null data of a set of input signals, according to some embodiments.
Figure 6:
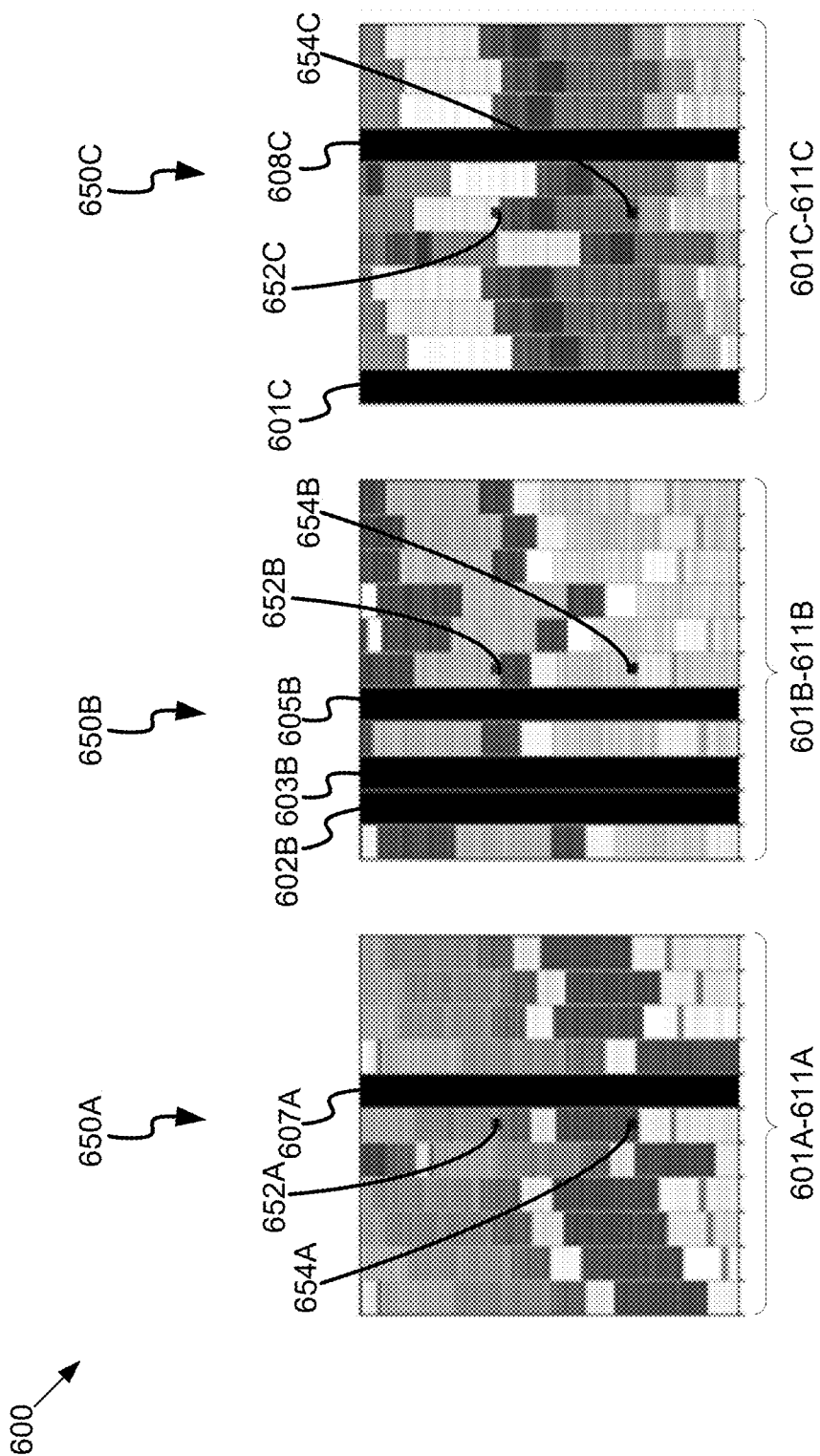
FIG. 6 depicts an example input array having null data mapped to zero, according to some embodiments.

FIG. 4 depicts signals corresponding to 11 wellbores with no missing data. However, when comparing wellbores of differing depths or data sets, there may be null and/or missing data. For example, different logging of the wellbore parts of the data may not have been detected—resulting in null and/or missing data. In some embodiments, well signals can be transformed according to a function in order to represent null data. FIGS. 5-6 depict a transform for mapping null data to a zero value and an example input tile having null data mapped to zero, respectively.

To help illustrate, FIG. 5 depicts a graph of an example transform for representing null data of a set of input signals, according to some embodiments. FIG. 5 shows a graph 500 having an x-axis 504 (input x) and a y-axis 506 (output y). Real-valued data from input signals can be an input to a transform function to output a compressed range of values. A transform function can be used to map input values within a range defined by an input lower value 508 and an input upper value 510 to a compressed range defined by an output lower value 512 and an output upper value 514. An example transform function can be defined by Equation 2:

$$y=f(x) \quad (2)$$

where y is a transformed value, x is an input value, and f(x) is a transform function.

The transform function can map the input lower value 508 to the output lower value 512, where the input lower value 508 is the input value to the transform function and the output lower value 512 is the transformed value output from the transform function. As depicted in FIG. 5, the input lower value 508 is equal to a, the upper input value 510 is equal to b, the output lower value 512 is equal to a', and the output upper value 514 is also equal to b. Thus, input values having an original interval defined by the lower and upper input values 508 and 510, respectively, (i.e. an interval [a, b]) can be transformed to have a compressed interval defined by the lower and upper output values 512 and 514, respectively (i.e. an interval [a', b]).

Following a transform, well data input to the transform function can be represented by a compressed range of values and null values in the original well data can be mapped to a zero value, where the lower output value 512 is greater than the lower input value 508 and the lower input value 508 is greater than or equal to zero. Transformed data (represented by a curve 502) then can have no data in an interval defined between zero and the lower output value 512. This interval (i.e. an interval [0, a']) can then act as a buffer between null data and real-valued data when the transformed data is processed for signal alignment.

To help illustrate, FIG. 6 depicts an example input array having null data mapped to zero, according to some embodiments. FIG. 6 depicts an example input array 600 including well logs 650A, 650B, and 650C for a number of wellbores. As depicted in FIG. 6, the input array 600 includes wellbore data for 11 wellbores, where each wellbore's data is represented within a different column of each of the well logs 650A, 650B, and 650C.

Similar to FIG. 4, each wellbore's data can be represented within a single signal. FIG. 6 depicts the well log 650A as having 11 signals 601A-611A, the well log 650B as having 11 signals 601B-611B, and the well log 650C as having 11 signals 601C-611C. A signal can include data from the same wellbore across each well log (i.e., data of the signal 601A, the signal 601B, and the signal 601C can be collected from a single wellbore). Upper control points 652A, 652B, and 652C and lower control points 654A, 654B, and 654C corresponding to control points defined for a reference signal of an input tile (the signal 306 of the input tile 300, for example) are depicted.

As depicted in FIG. 6, the well logs 650A, 650B, and 650C each contain one or more signals having null values mapped to zero. A signal of a well log can be null data when a corresponding signal of another well log contains real-valued data. For example, a signal of an input tile (the signal 507 of the input tile 300, for example) can represent well data from a first wellbore, and the well log 650A can contain data relating to porosity for each wellbore, the well log 650B can contain data relating to formation density for each wellbore, and the well log 650C can contain data relating to gamma ray measurements for each wellbore. However, it may be the case that one or more types of data was not collected for a given wellbore. For example, if porosity data was not collected from a wellbore, but formation density data and gamma ray data were, then the wellbore data from that wellbore would have null (i.e. missing) porosity data. That null data can be mapped to zero by transforming the wellbore data (as described in reference to FIG. 5, for example). Thus, a signal of the well log 650A (porosity, in this example) for that wellbore would have values mapped to zero. Continuing the example of the signal 307, the corresponding signal 607A can have values mapped to zero and real-valued (but compressed) data represented by the signals 607B and 607C in the well logs 650B and 650C, respectively.

Multiple wellbores may include differing types of data and/or null data. FIG. 6 depicts null data mapped to zero for the signals 602B, 603B, and 605C within the well log 650B and the signals 601C and 608C within the well log 650C. While FIG. 6 depicts each of the well logs 650A, 650B, and 650C as having null data, in some cases, a subset of a total number of well logs of an input array may have null data. For example, only two well logs of the input array 600 may have a signal having null data. Alternatively, there may be only a single well log containing null data. Further, some wellbore data may include null data across multiple well logs (i.e. two or more signals corresponding to a single wellbore are null data). Additionally, there may be a greater or lesser number of null data signals within a well log than depicted in FIG. 6.

In some embodiments, null data can be represented by adding an additional binary signal for each well log of the original signal and the binary signals can be used to indicate whether a signal contains null or real-valued data. For example, the input array 600 may include a binary signal for each of the well logs 650A, 650B, and 650C, where the binary signal for the well log 650A indicates that signals 601A-606A and 608A-611A contain real-valued data (e.g. a binary value of 1) and that the signal 607A contains null data (e.g. a binary value of 0).

In some embodiments, null data may be represented using a pseudo-random pattern. For example, the signals 607A, 607B, 603B, 605B, 601C, and 608C, can be represented by a pseudo-random pattern rather than black boxes (which are interpreted as a zero value when input into a trained neural network for signal alignment). However, in some embodiments, in such representations, a horizontal dimension of each signal must be greater than one (i.e., w>1).

Figure 7:
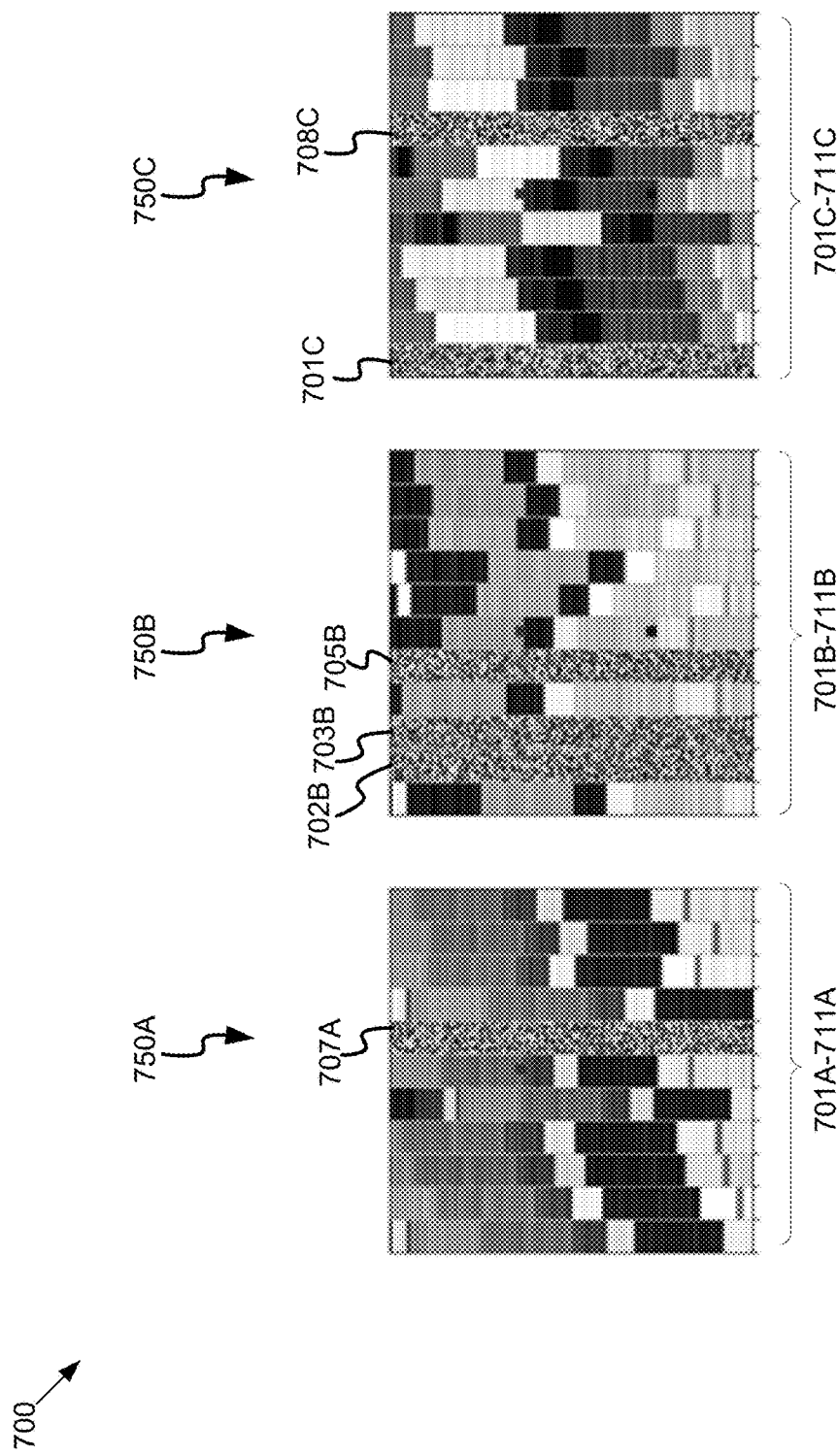
FIG. 7 depicts the example input array of FIG. 6 with null data represented by a pseudo-random pattern, according to some embodiments.

To help illustrate, FIG. 7 depicts the example input array of FIG. 6 with null data represented by a pseudo-random pattern, according to some embodiments. FIG. 7 depicts an example input array 700 generated from the same well data represented by FIG. 6, but with null data represented by a pseudo-random pattern in place of black boxes. The input array 700 includes three well logs 750A, 750B, and 750C, each having 11 signals. The well log 750A includes signals 701A-711C, the well log 750B includes signals 701B-711B, and the well log 750C includes signals 701C-711C. As depicted, the signals 707A, 702B, 703B, 705B, 701C, and 708C (which correspond to the signals 607A, 607B, 603B, 605B, 601C, and 608C, respectively) contain null data that is represented by a pseudo-random pattern.

Returning to FIG. 1, one or more input control points can be defined for a reference signal of an input tile representing the input array 104 (as described in reference to FIGS. 3-7), and the trained neural network 110 can output one or more control points for each wellbore where each output control point represents a depth within each wellbore that corresponds to a depth within the reference wellbore at which the input control point is defined. Similar to the input array 104, output control points can be an array having dimensions of a height, a width, and a number of channels.

The height of the output array can be equal to a number of samples, $N_D$ (i.e. a number of rows of the output array). The number of samples of the output array can be equal to the number of samples of the input array 104. The width of the output array can be equal to the width of the input array 104 and can be defined by Equation (1) as recited above in reference to FIG. 1. The number of channels, $N_C$, of the output array can be equal to a number of control points defined for a reference signal of the input tile representing the input array 104. For example, with reference to FIG. 3, the output array can have 2 channels for the input tile 300, where the reference signal 306 has two control points 352 and 354 defined. Examples described herein depict the number of channels of the output array as equal to 2, however, a greater or lesser number of channels may be included in the output array.

The output control points can indicate depths within each wellbore where formation properties and/or downhole measurements are similar. For example, with reference to FIG. 3, the upper control point 352 can be at a first depth within a first wellbore and an output control point can indicate a depth within one or more wellbores where the formation properties are similar. The output control points can be a visual representation of correlated depths. In some embodiments, an intensity and/or diffusivity of the output control points can be related to a confidence associated with the identified output control points.

Figure 8:
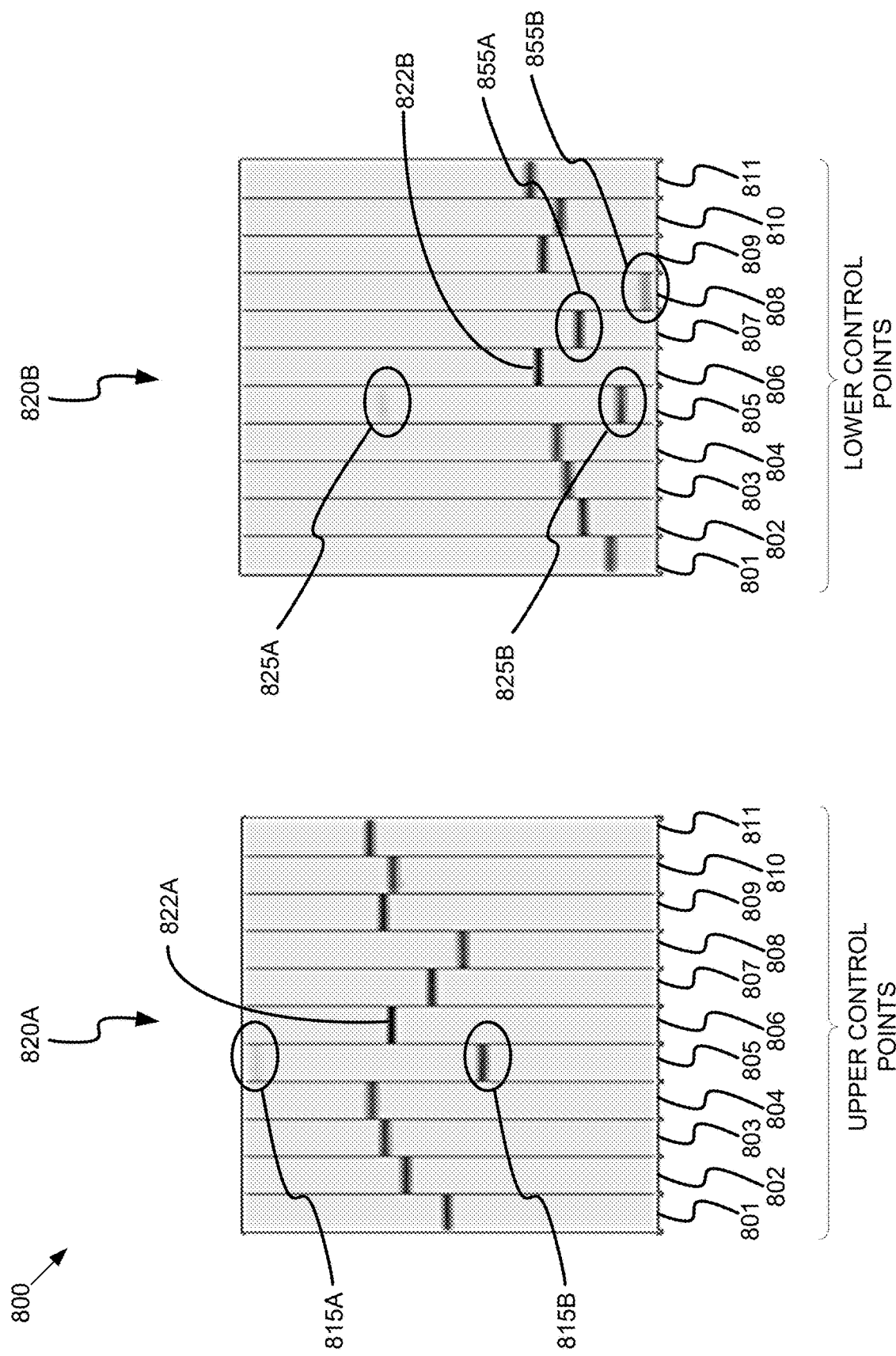
FIG. 8 depicts an example output set of upper and lower control points corresponding to a set of input signals, according to some embodiments.

To help illustrate, FIG. 8 depicts an example output set of upper and lower control points corresponding to a set of input signals, according to some embodiments. FIG. 8 depicts an example set of control point mappings 800 for an input tile having two control points defined for a reference signal of the input tile. For example, the set of control point mappings 800 may be a set of output control points that correspond to the input tile 300 of FIG. 3. The set of control point mappings 800 includes a set of upper control point mappings 820A and a set of lower control point mappings 820B. The sets of upper and lower control point mappings 820A and 820B, respectively, can be images divided into columns. FIG. 8 depicts output images from a trained neural network (e.g. the trained neural network 110 of FIG. 1) divided into 11 columns, 801-811, where each column corresponds to a signal of an input tile. For example, with reference to FIG. 3, the columns 801-811 can correspond to the signals 301-311 of the input tile 300.

An output upper control point 822A for a reference signal of the input tile (the signal 306, in this example) can be located at the same position within the reference signal as the input upper control point 352 and an output lower control point 822B can be located at the same position within the reference signal as the input lower control point 354. The input and output upper control points 352 and 722A can correspond to a depth within a wellbore, where the reference signal 306 represents well data from that wellbore across a range of depths. Each control point can be assigned a value between zero and 1 that indicates the probability. Because the output upper control points 820A are determined based on the identified reference signal, and the reference signal 306 corresponds to the column 806, the output upper control point 822A can represent a probability of 1. The same can be true for the input and output lower control points 354 and 822B.

In some embodiments, an intensity and/or diffusivity of output control points of the sets of upper and lower control point mappings 820A and 820B can represent a probability that the location of the output control point is accurate. An output lower control point 855B for the signal 308 corresponds to the lower control point 354. However, the output lower control point 855B has lower intensity relative to an output lower control point 855A for the signal 808. This can indicate a lower probability associated with a determined corresponding depth within that wellbore (of the signal 808).

In some cases, a set of control point mappings may include more than one corresponding upper and/or lower control point for a single signal. FIG. 8 depicts the column 806 as having two output upper control points, 815A and 815B, and two output lower control points, 825A and 825B. As depicted, the output upper control point 815B has a greater visual intensity (i.e. less diffuse) relative to the output upper control point 815A, indicating a higher probability that the position (depth) of the output upper control point 815B corresponds to the position of the control point 822A compared to the position of the output upper control point 815A. FIG. 8 depicts the output control points 825A and 825B similar to the output control points 815A and 815B.

Figure 9A:
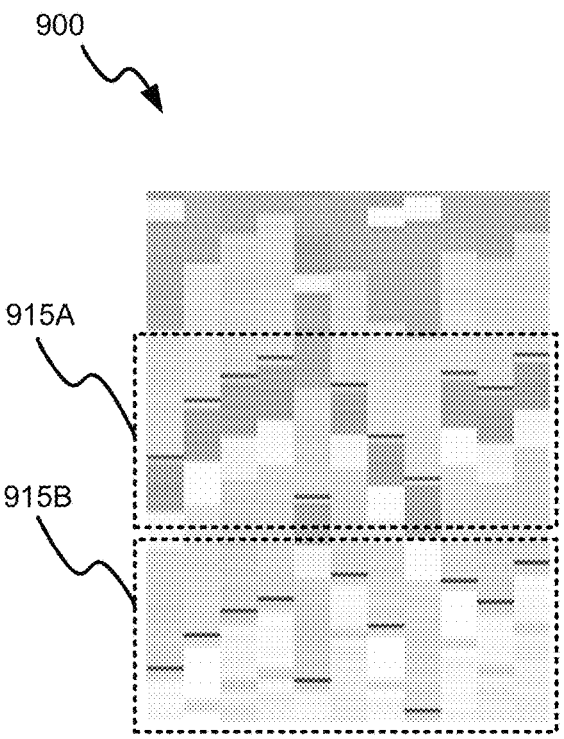
FIGS. 9A-9D depict example alternative visual representations of control points output by a machine-learning model for well correlation, according to some embodiments.
Figure 9B:
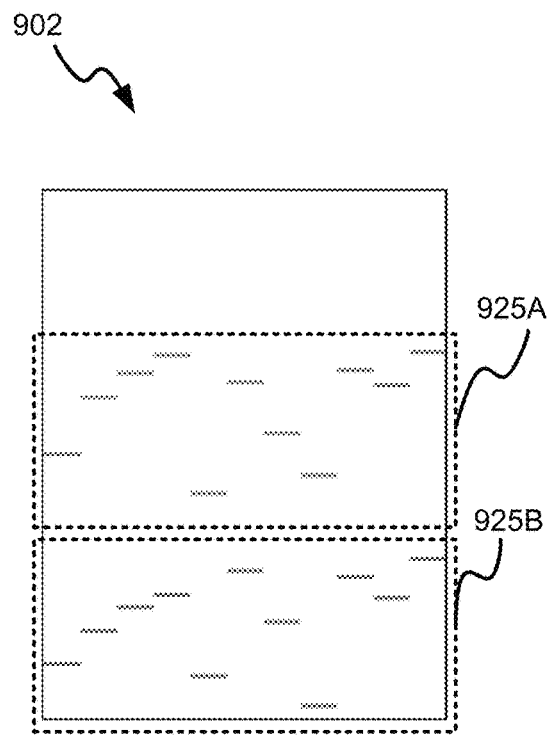

FIGS. 9A-9D depict example alternative visual representations of control points output by a machine-learning model for well correlation, according to some embodiments. In some embodiments, output control points can be depicted on an input tile. FIG. 9A depicts a set of upper control point mappings 915A and a set of lower control point mappings 915B overlaid on an example input tile 900. Alternatively, a trained machine-learning model can output solely the output control point mappings associated with one or more input control points. FIG. 9B depicts a set of upper control point mappings 925A and a set of lower control point mappings 925B.

Figure 9C:
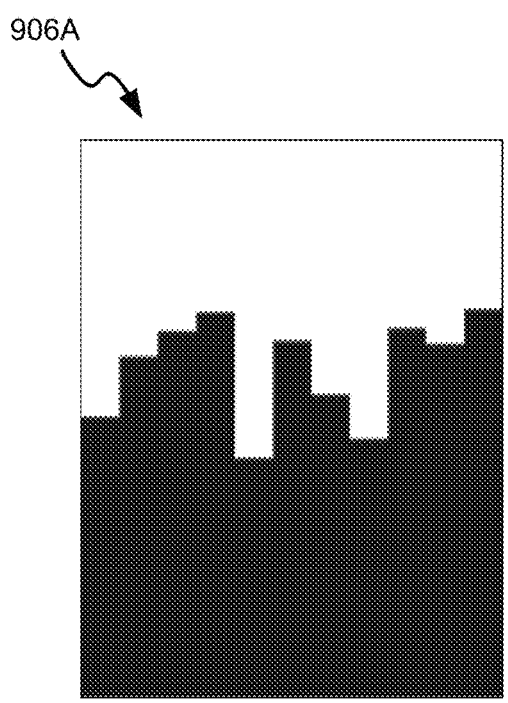
Figure 9D:
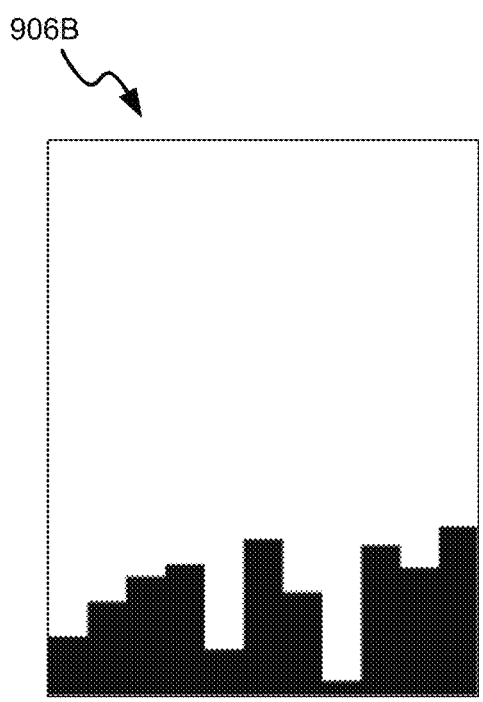

In some embodiments, an area below an output control point can be assigned a value of 1 and an area above the output control point can be assigned a value of 0. To help illustrate, FIGS. 9C-9D depict, respectively, an alternative visual representation of a set of upper control point mappings and a set of lower control point mappings. FIG. 9C depicts an image 906A illustrating an example set of upper control point mappings where an area below an output upper control point is assigned a value of 1 and an area above the output upper control point is assigned a value of 0. FIG. 9D depicts an image 906B illustrating an example set of lower control point mappings where an area below the output lower control point is assigned a value of 1 and an area above the output lower control point is assigned a value of 0. Alternatively, an area above the output control point can be assigned a value of 1 and an area below the output control point can be assigned a value of 0.

Returning to FIG. 1, the control point mappings can be an output array from the trained neural network 110 can then be input into an alignment module 112 to align the signals of the input array 104. In some embodiments, the control point mappings can be stored as stored labelled data 116 to be used by the training module 114 in unsupervised learning processes. The alignment module 112 may be a pre-trained machine-learning model. In some embodiments, the alignment module 112 and the trained neural network 110 can be combined into a single trained machine-learning model. The output array from the trained neural network 110 can represent estimated control point mappings for each signal of the input tile representing the input array 104. These estimated control point mappings can be formulated as an over-constrained system of equations.

In some embodiments, the input array 104 can be modified to generate additional control point mappings. For example, signals of the input array 104 can be flipped vertically to generate a second input array, which can be input into the trained neural network 110 to obtain additional sets of output control points. Alternatively or in addition, signals of the input array 104 can be rearranged. For example, an order of the signals of the input array can be modified. In some embodiments, additional input arrays can be generated from the input array 104 by vertically flipping the signals and shuffling the order of the signals. This can be repeated until a sufficient number of control point mappings to formulate the over-constrained system of equations.

Returning to FIG. 1, the alignment module 112 can solve the over-constrained system of equations to generate a set of shifts between control points of the output array. In some embodiments, the alignment module 112 can solve the over-constrained system of equations using a least squares regression. The set of shifts between control points generated by the alignment module 112 can then be used to generate a set of aligned signals 120.

To help illustrate, FIG. 10 depicts an example prediction workflow employing a machine-learning model for performing well correlation, according to some embodiments. FIG. 10 depicts an example prediction workflow 1000 for an input tile 1002 having 11 signals. The input tile 1002 can represent an input array that is similar to any of the input arrays described herein. The input tile 1002 can represent an input array having multiple well logs. For example, with reference to FIG. 4, the input tile 1002 may represent the input array 400. In some embodiments, the input tile 1002 may include null data mapped to zero. For example, with reference to FIG. 6, the input tile 1002 can represent the input array 600. Alternatively, the input tile 1002 can include null data represented as a pseudo-random pattern. For example, with reference to FIG. 7, the input tile 1002 can represent the input array 700.

The input tile 1002 can include one or more control points defined for a reference signal of the input tile 1002. In some embodiments, the input tile 1002 can include an upper control point and a lower control point. For example, with reference to FIG. 3, the input tile 1002 can be the input tile 300 and have the upper control point 352 and the lower control point 354 defined for the reference signal 306. FIG. 10 depicts the example prediction workflow 1000 for the input tile 1002 having two control points. However, the input tile 1002 may have a greater or lesser number of control points.

The input tile 1002 can be input into a trained neural network 1006 to generate an output array representing a first set of control point mappings 1008A. The trained neural network 1006 can be a U-NET. For example, the trained neural network 1006 may be the trained neural network 110. The set of control point mappings 1008A can include output control points for each signal corresponding to the control point(s) defined for the reference signal of the input tile 1002. The set of control point mappings 1008A can be represented as an image, where an intensity and/or diffusivity of each output control point is correlated to a probability. For example, with reference to FIG. 8, the set of control point mappings 1008A may be the set of control point mappings 800. The set of control point mappings 1008A can then be used to formulate a system of equations to determine a set of shifts for signals of the input tile 1002 in order to generate a set of aligned signals 1010.

If the formulated system is under-constrained, additional constraints can be obtained by processing a modified input tile 1004 that is generated from the input tile 1002. FIG. 10 depicts the modified input tile 1004 as being a vertically flipped image of the input tile 1002. Alternatively or in addition, the modified input tile 1004 can be generated by rearranging an order of signals of the input tile 1002. The modified input tile 1004 can be input into the trained neural network 1006 to generate a second set of control point mappings 1008B corresponding to the signals of the input tiles 1002/1004. The second set of control point mappings 1008B can be represented similar to the first set of control point mappings 1008A. Additional constraints for the system can be determined based on the second set of control point mappings 1008B. Once the system is over-constrained, the set of shifts can be determined using a least squares regression. The set of shifts can then be used to align the signals of the input array 1002 to generate the set of aligned signals 1010.

Returning to FIG. 1, for example, the input array 104 can be processed by the trained neural network 110 and the alignment module 112 to generate a first set of aligned signals 120. In some embodiments, this process can be performed iteratively to increase a resolution of the set of aligned signals 120. The set of aligned signals 120 may then be input into the trained neural network 110 to obtain a second output array representing a set of control point mappings corresponding to the set of aligned signals 120. The second output array can have a set of control point mappings having an increased probability. The second output array can then be processed by the alignment module 112 to generate a second set of aligned signals having a higher resolution than the set of aligned signals 120. This process can be repeated until a resolution of the set of aligned signals 120 and/or a probability associated with control points of the output array output from the trained neural network 110 is above a threshold.

Example Operations

Figure 11:
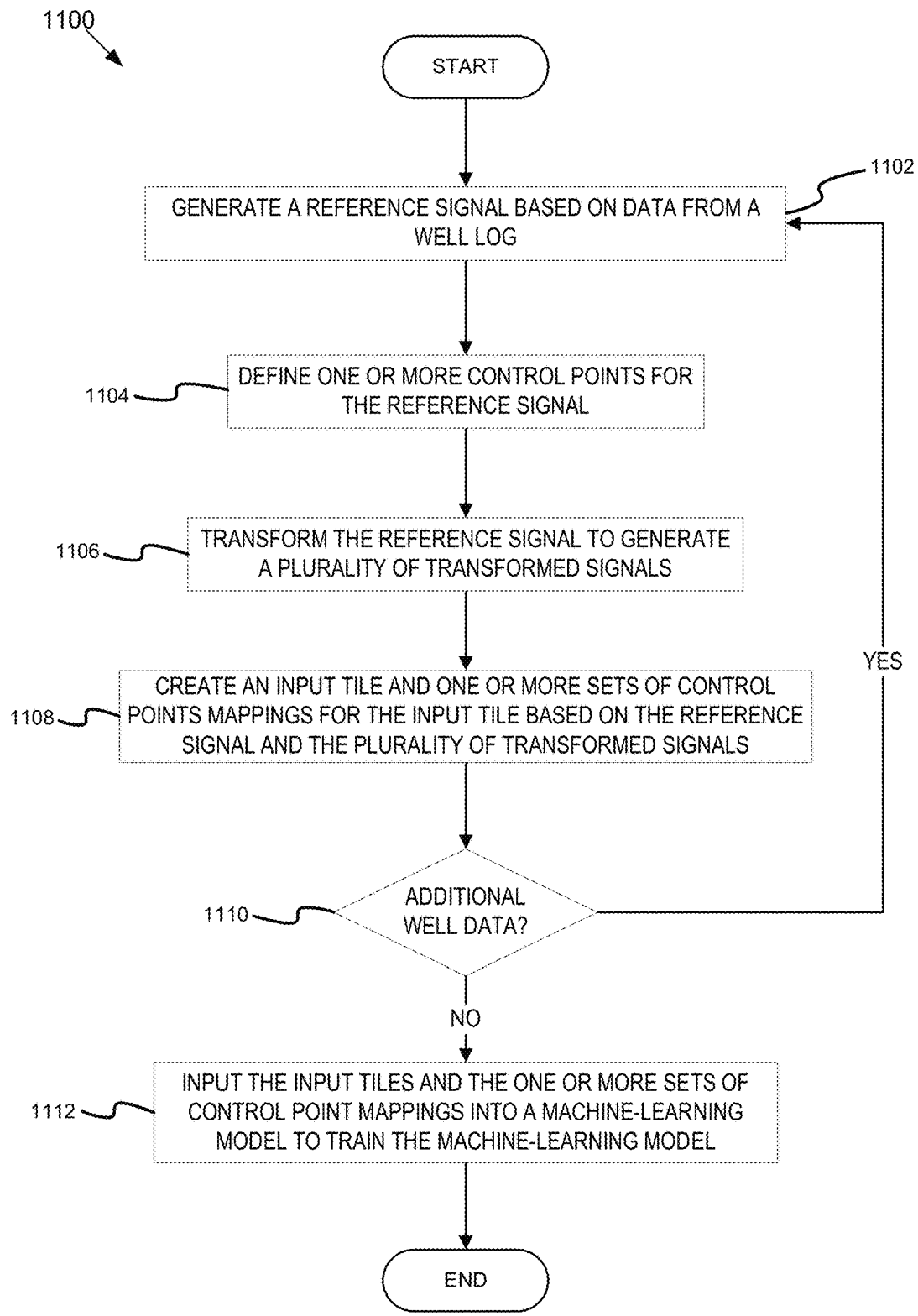
FIG. 11 depicts a flowchart of example operations for training a machine-learning model to perform well correlation, according to some embodiments.

To further illustrate, operations for training a machine-learning model to perform well correlation and performing well correlation using said model are now described with reference to FIGS. 11-12, respectively. Operations of flowcharts 1100-1200 can be performed by software, firmware, hardware, or a combination thereof. Operations of the flowcharts 1100-1200 are described in reference to the example system 100 of FIG. 1. However, other systems and components can be used to perform the operations now described. FIG. 11 depicts a flowchart of example operations for training a machine-learning model to perform well correlation, according to some embodiments. The operations of the flowchart 1100 are now described with reference to the example training workflow of FIG. 2. The operations of the flowchart 1100 begin at block 1102.

At block 1102, a reference signal is generated based on data from a well log. The well log can be derived during logging of the wellbore. Alternatively, data from the well log can be from synthetic data (not derived from actual logging of a wellbore). The reference signal can be a visual representation of data of the well log. For example, with reference to FIG. 2, the data can be represented in heatmap form as the well signal 201. Data of the well log can include raw and/or processed data for a wellbore. For example, the data can include porosity data, formation type data, gamma ray measurement data, and/or any other data type of a downhole and/or formation attribute. In some embodiments, a computer can be used to generate the reference signal from data from the well log. For example, with reference to FIG. 1, data from the well log can be input into the pre-processing module 108 of the computer 106 to generate a reference signal.

At block 1104, one or more control points are defined for the reference signal. The one or more control points can be defined at a position within the reference signal that corresponds to a depth within the wellbore from which the data was acquired. In some embodiments, an upper control point and a lower control point can be defined for the reference signal. For example, the upper control point 205 and the lower control point 207 are defined at a first and second position within the signal 201. Optionally, additional control points can be defined within the reference signal.

At block 1106, the reference signal is transformed to generate a plurality of transformed signals. The reference signal can be transformed be performing one or more transforms on the reference signal. For example, transformed signals can be generated from the well signal 201 by shifting the signal 201, scaling the signal 201, adjusting (increasing and/or decreasing) an amplitude of the signal 201, adding noise to the signal 201, setting some signal values to null values, etc.

At block 1108, an input tile and one or more sets of control point mappings for the input tile are created based on the reference signal and the plurality of transformed signals. The input tile can be created by combining the reference signal and the plurality of transformed signals. For example, the input tile 206 can be generated by combining the well signal 201 with the transformed signals 209 generated from the well signal 201. The sets of control point mappings can be determined based on the control points defined for the reference signal and the transformed signals. For example, the sets of control point mappings 208 and 210 can be determined based on the control points 205 and 207 and the transformed signals 209. There may be a set of control point mappings that corresponds to each of the one or more control points defined for the reference signal. For example, the first set of control point mappings 208 can correspond to the upper control point 205 and the second set of control point mappings 210 can correspond to the lower control point 207.

At block 1110, a determination is made of whether there is additional well data. If there is determined to be additional well data, operations of the flowchart 1100 continue at block 1102 and an additional reference signal is generated based on the additional well data. If it is determined that there is no additional well data, operations of the flowchart 1100 continue at block 1112.

At block 1112, the input tile(s) and the one or more sets of control point mappings are input into a machine-learning model to train the machine-learning model. The machine-learning model can generate sets of control point mappings based on the input tile(s) and the generated sets of control point mappings can be compared to the input sets of control point mappings to determine accuracy. For example, the input tile 206, the first set of control point mappings 208, and the second set of control point mappings 210 can be input into a machine-learning model. Operations of the flowchart 1100 are complete.

Figure 12:
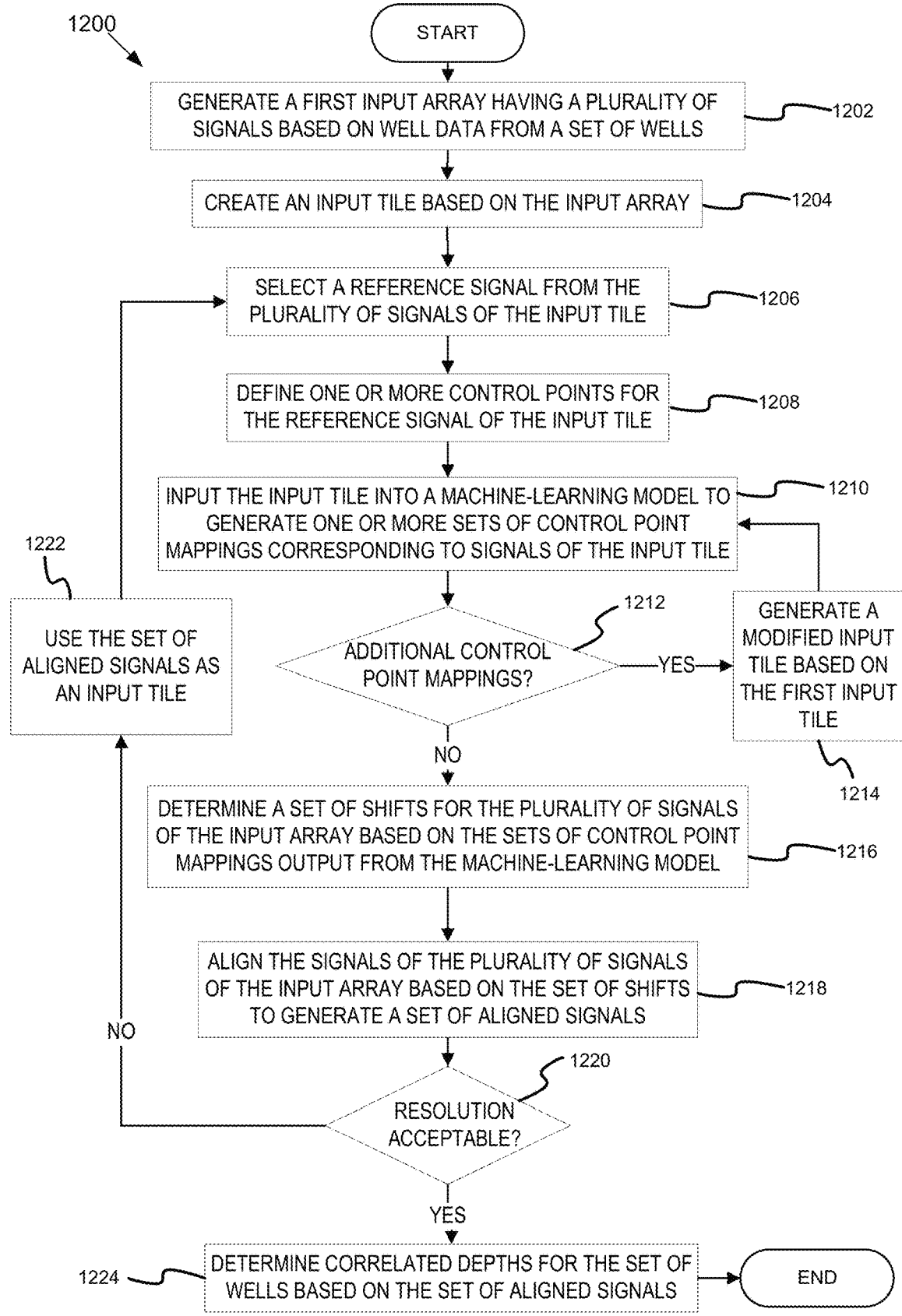
FIG. 12 depicts a flowchart of example operations for performing well correlation using a trained machine-learning model, according to some embodiments.

FIG. 12 depicts a flowchart of example operations for performing well correlation using a trained machine-learning model, according to some embodiments. The operations of the flowchart 1200 are described with reference to the example prediction workflow of FIG. 10. The operations of the flowchart 1200 begin at block 1202.

At block 1202, a first input array having a plurality of signals is generated based on wellbore data from a set of wellbores. Signals of the first input array can represent well data obtained from the set of wellbores. In some embodiments, each signal of the first input array can correspond to a different wellbore. For example, with reference to FIG. 3, each of the signals 301-311 can represent data obtained from distinct wellbores (i.e. a set of 11 wellbores). Alternatively, if there is an insufficient number of unique signals, one or more signals can be repeated to create an input array having an aspect ratio of approximately one.

The input array can include multiple well logs. For example, with reference to FIG. 4, the input array 400 includes the well logs 450A, 450B, and 450C. Each well log of the input array can include different data types. For example, the well log 450A can represent porosity data, the well log 450B can represent formation type data, and the well log 450C can represent gamma ray measurement data.

In some embodiments, the input array can include null data. Null data can be present in the input array when a type of data is unavailable for a given wellbore. In some embodiments, null data can be mapped to zero and real-valued data of the well log can be mapped to a compressed range. For example, with reference to FIG. 6, the input array 600 includes null data in each of the well logs 650A, 650B, and 650C, where the signals 607A, 602B, 603B, 605B, 601C, and 608C include null data mapped to zero. Alternatively, null data can be represented as a pseudo-random pattern. For example, with reference to FIG. 7, the input array 700 includes null data represented by a pseudo-random pattern for the signals 707A, 702B, 703B, 705B, 701C, and 708C.

At block 1204, an input tile is created based on the input array. The input tile can be a visual representation of data of the input array, where an intensity of a signal is correlated to an amplitude of that signal. For example, with reference to FIG. 10, the input tile 1002 can be generated based on an input array having 11 signals. The input tile can represent data from multiple well logs. For example, with reference to FIGS. 3-4, the input tile 300 can represent the input array 400.

At block 1206, a reference signal is selected from the plurality of signals of the input tile. The reference signal can be any one of the plurality of signals of the input tile. For example, with reference to FIG. 3, the reference signal can be the signal 306. The reference signal can be selected to determine depths within other wellbores where a formation property is similar to a formation property of the wellbore corresponding to the reference signal. For example, a given wellbore can correspond to the reference signal 306 to determine equivalent depths within wellbores corresponding to the signals 301-305 and 307-311.

At block 1208, one or more control points are defined for the reference signal of the input tile. The one or more control points can be positioned within the reference signal and can correspond to a depth within a reference wellbore. For example, with reference to FIG. 3, the upper control point 352 can correspond to a first depth within the reference wellbore and the lower control point 354 can correspond to a second depth within the reference wellbore.

At block 1210, the input tile is input into a machine-learning model to generate one or more sets of control point mappings corresponding to signals of the input tile. The machine-learning model can output a set of control point mappings for each control point defined for the reference signal of the input tile. For example, with reference to FIG. 8, the machine-learning model can output the set of upper control point mappings 820A and the set of lower control point mappings 820B for an input tile having two control points defined for the reference signal (e.g. the input tile 300, for example).

In some embodiments, the sets of control point mappings can indicate a probability associated with each control point of the set of control point mappings. The probability associated with a control point mapping can be represented visually as an intensity or diffusivity. For example, FIG. 8 depicts the control point 855B having a lower intensity (more diffuse or "spread out") relative to the control point 855A. This can indicate a lower probability associated with the determined position of the control point 855B compared to the probability associated with the determined position of the control point 855A.

At block 1212, a determination is made of whether additional control point mappings are needed. Additional control point mappings can be needed when a formulated system representing correlations between wellbores is under-constrained. If a determination is made that additional control point mappings are needed, operations of the flowchart 1200 continue at block 1214. If a determination is made that additional control point mappings are not needed, operations of the flowchart continue at block 1216.

At block 1214, a modified input tile is generated based on the first input tile. The modified input tile can be generated by transforming the first input tile. The first input tile can be transformed to create a modified input tile by flipping/mirroring the first input tile and/or rearranging and order of the signals of the input tile. For example, with reference to FIG. 10, the modified input tile 1004 can be generated from the input tile 1002 by vertically flipping the input tile 1002. The modified input tile can then be input into the machine-learning model to generate a second set of control point mappings. For example, the modified input tile 1004 can be input into the neural network 1006 to generate the second set of control point mappings 1008B. In some embodiments, this process can be repeated to generate additional sets of control point mappings.

At block 1216, a set of shifts for the plurality of signals of the input array is determined based on the sets of control point mappings output from the machine-learning model. The set of shifts can be determined by solving the formulated system which correlates wells once the system is over-constrained by the sets of control point mappings for the input tile. For example, the set of shifts can be determined by performing a least squares regression.

At block 1218, the signals of the plurality of signals of the input array are aligned based on the set of shifts to generate a set of aligned signals. Each signal of the input tile can be shifted based on a corresponding shift of the set of shifts to align the signal with the reference signal of the input tile. For example, with reference to FIG. 10, signals of the input tile 1002 can be shifted based on the set of shifts to generate the set of aligned signals 1010.

At block 1220, a determination is made of whether the resolution of the set of aligned signals is acceptable. If the resolution of the set of aligned signals is not acceptable, the set of aligned signals can be used as an input tile to further refine alignment of the signals. If the resolution of the set of aligned signals is acceptable, operations of the flowchart 1200 continue at block 1224.

At block 1222, the set of aligned signals is used as an input tile and operations continue at block 1206 where a reference signal is selected from the set of aligned signals. For example, with reference to FIG. 10, the set of aligned signals 1010 can be used as an input tile.

At block 1224, correlated depths for the set of wellbores are determined based on the set of aligned signals. The correlated depths for wells of the set of wellbores can be defined relative to the reference well. The set of aligned signals can be used to determine a depth within each wellbore of the set of wellbores at which a formation property/attribute of the wellbore is substantially equivalent or similar to the formation property/attribute of the reference wellbore at the depth(s) that correspond to the one or more control points defined for the reference signal. For example, with reference to FIG. 3, the upper control point 352 can be defined at a depth of 50 feet within a reference wellbore and a formation surrounding the reference wellbore can have a measured (or determined) porosity at that depth. Based on the set of aligned signals, a correlated depth within another wellbore can be determined, where the porosity of the other wellbore (of the set of signals of the input tile) at the correlated depth is substantially equivalent to the porosity of the reference wellbore at a depth of 50 feet. Operations of the flowchart 1200 are complete.

FIGS. 11-12 are annotated with a series of numbers. These numbers represent stages of operations. Although these stages are ordered for this example, the stages illustrate one example to aid in understanding this disclosure and should not be used to limit the claims. Subject matter falling within the scope of the claims can vary with respect to the order and some of the operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 1204 and 1206 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Example Computer

Figure 13:
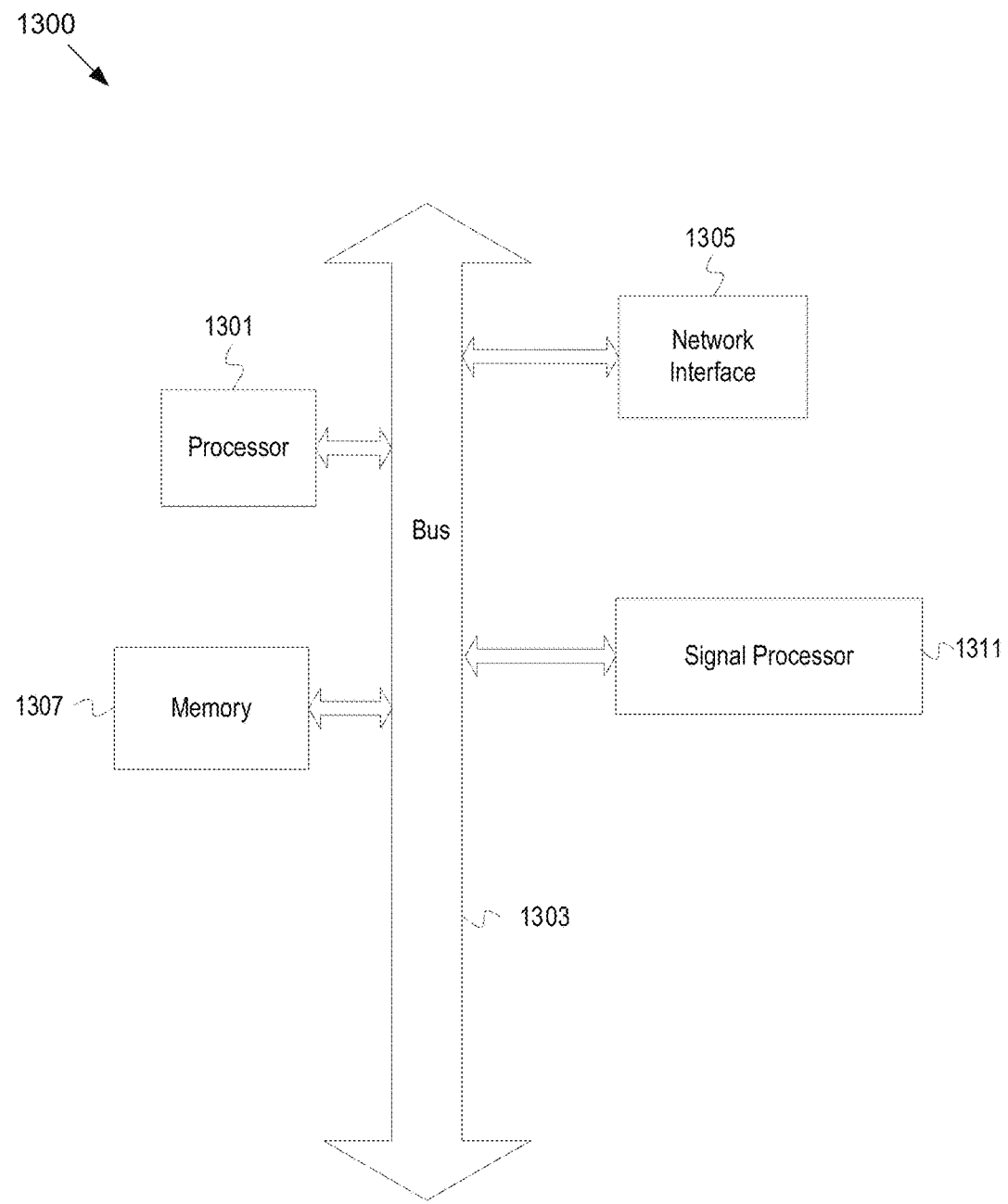
FIG. 13 depicts an example computer, according to some embodiments.

FIG. 13 depicts an example computer, according to some embodiments. A computer 1300 includes a processor 1301 (possibly including multiple processors, multiple cores, multiple nodes, and/or implementing multi-threading, etc.). The computer 1300 includes a memory 1307. The memory 1307 may be system memory or any one or more of the above already described possible realizations of machine-readable media. The computer 1300 also includes a bus 1303 and a network interface 1305.

The computer 1310 also includes a signal processor 1311. The signal processor 1311 may perform one or more operations described herein. Any one of the previously described functionalities may be partially (or entirely) implemented in hardware and/or on the processor 1301. For example, the functionality may be implemented with an application specific integrated circuit, in logic implemented in the processor 1301, in a co-processor on a peripheral device or card, etc. Further, realizations may include fewer or additional components not illustrated in FIG. 13 (e.g., video cards, audio cards, additional network interfaces, peripheral devices, etc.). The processor 1301 and the network interface 1305 are coupled to the bus 1303. Although illustrated as being coupled to the bus 1303, the memory 1307 may be coupled to the processor 1301.

While the aspects of the disclosure are described with reference to various implementations and exploitations, it will be understood that these aspects are illustrative and that the scope of the claims is not limited to them. In general, techniques for multiple signal alignment as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

EXAMPLE EMBODIMENTS

Embodiment 1: A method comprising performing wellbore correlation across multiple wellbores, the performing comprising, predicting a depth alignment across the multiple wellbores based on at least one geological feature of subsurface formations in which the multiple wellbores are located, wherein the predicting comprises, selecting a reference wellbore from among the multiple wellbores; defining at least one control point in a reference signal of a reference well log for the reference wellbore, wherein the reference well log includes changes in the at least one geological feature over a depth of the reference wellbore; generating an input tile that comprises the reference signal, the at least one control point, and a number of non-reference well logs, wherein the number of non-reference well logs corresponds to a set of non-reference wellbores, and wherein each of the number of non-reference well logs includes changes in the at least one geological feature over a depth of each non-reference wellbore of the set of non-reference wellbores; inputting the input tile into a machine-learning model; and in response to inputting the inputting the input tile into the machine-learning model, outputting, from the machine-learning model, a corresponding control point for each of the number of non-reference well logs that corresponds to the at least one control point of the reference well log.

Embodiment 2: The method of Embodiment 1, wherein predicting the depth alignment comprises aligning the reference well log and the set of non-reference well logs based on the at least one control point and the corresponding control point for each of the number of non-reference well logs that is output from the machine-learning model.

Embodiment 3: The method of Embodiment 2, wherein the reference well log and each of the number of non-reference well logs comprises multiple channels, wherein each channel corresponds to a different geological feature of the at least one geological feature, wherein defining the at least one control point comprises defining at least one control point for each channel in the reference well log, and wherein aligning comprises aligning, using the machine-learning model, the at least one control point for each channel in the reference well log with a point in a corresponding channel of each of the number of non-reference well logs.

Embodiment 4: The method of any one of Embodiments 1-3, wherein predicting the depth alignment across the multiple wellbores comprises prior to inputting the reference well log and the non-reference well logs, identifying null data in each of the non-reference well logs; and transforming the null data into non-null data.

Embodiment 5: The method of Embodiment 4, wherein transforming the null data into non-null data comprises setting the null data to a same value.

Embodiment 6: The method of Embodiment 5, wherein the same value is zero.

Embodiment 7: The method of Embodiment 4, wherein transforming the null data into non-null data comprises setting the null data to values according to a pseudo-random number pattern.

Embodiment 8: The method of any one of Embodiments 1-7, further comprising: training the machine-learning model, wherein the training comprises, inputting, into the machine-learning model, a number of well logs and at least one control point for each of the number of well logs; inputting, into the machine-learning model, a mapping among the at least one control point across each of the number of well logs; and training the machine-learning model based on the number of well logs and the mapping among the at least one control point across each of the number of well logs.

Embodiment 9: The method of Embodiment 8, wherein the number of well logs are based on actual well logging operations.

Embodiment 10: The method of Embodiments 8 or 9, wherein the number of well logs includes synthetic data.

Embodiment 11: One or more non-transitory machine-readable media comprising program code executable by a processor to cause the processor to: select a reference wellbore from among multiple wellbores; define at least one control point in a reference signal of a reference well log for the reference wellbore, wherein the reference well log includes changes in at least one geological feature over a depth of the reference wellbore; generate an input tile that comprises the reference signal, the at least one control point, and a number of non-reference well logs, wherein the number of non-reference well logs corresponds to a set of non-reference wellbores, and wherein each of the number of non-reference well logs includes changes in the at least one geological feature over a depth of each non-reference wellbore of the set of non-reference wellbores; input the input tile into a machine-learning model; and in response to inputting the input tile into the machine-learning model, output, from the machine-learning model, a corresponding control point for each of the number of non-reference well logs that correspond to the at least one control point of the reference well log.

Embodiment 12: The one or more non-transitory machine-readable media of Embodiment 11, wherein the program code comprises program code executable by the processor to cause the processor to: align the reference well log and the number of non-reference well logs based on the at least one control point and the corresponding control point for each of the number of non-reference well logs that is output from the machine-learning model.

Embodiment 13: The one or more non-transitory machine-readable media of Embodiments 11 or 12, wherein the reference well log and each of the number of non-reference well logs comprises multiple channels, wherein each channel corresponds to a different geological feature of the at least one geological feature, wherein the program code comprises program code executable by the processor to cause the processor to: define at least one control point for each channel in the reference well log; and align the at least one control point for each channel in the reference well log with a point in a corresponding channel of each of the number of non-reference well logs.

Embodiment 14: The one or more non-transitory machine-readable media of any one of Embodiments 11-13, wherein the program code comprises program code executable by the processor to cause the processor to: prior to inputting the reference well log and the non-reference well logs, identify null data present in each of the non-reference well logs; and transform the null data into non-null data.

Embodiment 15: The one or more non-transitory machine-readable media of Embodiment 14, wherein the null data is transformed into the non-null data by setting the null data to a same value.

Embodiment 16: The one or more non-transitory machine-readable media of Embodiment 14, wherein the null is transformed into the non-null data by setting the null data to values according to a pseudo-random number pattern.

Embodiment 17: An apparatus comprising: a processor; and a machine-readable medium having program code executable by the processor to cause the processor to, train a neural network for performing wellbore correlation across multiple wellbores, wherein the program code executable by the processor to cause the processor to train the neural network comprises program code executable by the processor to cause the processor to, generate a reference well log based on wellbore data for a wellbore; define at least one reference control point for the reference well log; apply one or more transformations to the reference well log having the at least one reference control point defined to create a plurality of transformed well logs; create a training input tile that comprises the reference well log, the at least one reference control point for the reference well log, and the plurality of transformed well logs; create a training set that comprises the training input tile and an input mapping among the at least one reference control point across each of the plurality of transformed well logs, wherein the input mapping includes at least one corresponding control point for each transformed well log of the plurality of transformed well logs, wherein the at least one corresponding control point corresponds to the at least one reference control point; and train the neural network using the training set.

Embodiment 18: The apparatus of Embodiment 17, wherein the program code executable by the processor to cause the processor to apply the one or more transformations to the reference well log comprises program code executable by the processor to cause the processor to: applying at least one of shifting, compressing, stretching, an amplitude increase, an amplitude decrease, adding noise, and setting a value of at least a portion of data to null.

Embodiment 19: The apparatus of Embodiments 17 or 18, wherein the program code executable by the processor to cause the processor to train the neural network using the training set comprises program code executable by the processor to cause the processor to: output, from the neural network, a predicted mapping among the at least one reference control point across each of the plurality of transformed well logs, wherein the predicted mapping includes at least one predicted corresponding control point for each transformed well log of the plurality of transformed well logs, wherein each of the at least one predicted corresponding control point is associated with a probability, wherein the probability associated with each of the at least one predicted corresponding control points is based on the training input tile and the predicted mapping.

Embodiment 20: The apparatus of any one of Embodiments 17-19, wherein the reference well log comprises multiple channels, wherein each channel corresponds to a different geological feature of a formation surrounding the wellbore, and wherein the program code executable by the processor to cause the processor to define the at least one reference control point for the reference well log comprises program code executable by the processor to cause the processor to define at least one reference control point for each channel of the reference well log.

What is claimed is:

1. A method for training and using a neural network on a computer system to perform wellbore correlation across multiple wellbores using a machine-learning model implemented via the neural network, the method comprising:
training the neural network wherein the training includes
obtaining a first number of well logs;
generating a training reference signal based on the first number of well logs;
transforming the training reference signal to generate one or more transformed signals;
generating a training input tile and at least one control point mapping across each of the first number of well logs based on the training reference signal and the one or more transformed signals;
inputting, into the neural network, the training input tile and at least one control point for each of the first number of well logs;
inputting, into the neural network, the at least one control point mapping across each of the first number of well logs; and
training the neural network based on the training input tile and the at least one control point mapping across each of the first number of well logs;
predicting a depth alignment across the multiple wellbores based on at least one formation property of subsurface formations in which the multiple wellbores are located, wherein the predicting comprises,
logging the multiple wellbores to obtain wellbore data, wherein the wellbore data includes a second number of well logs of the at least one formation property for the corresponding multiple wellbores;
selecting a reference wellbore from among the multiple wellbores and a corresponding reference well log from the second number of well logs;
defining at least one control point in a reference signal of the reference well log for the reference wellbore, wherein the reference well log includes changes in the at least one formation property at a depth of the reference wellbore;
generating an input tile that comprises the reference signal, the at least one control point, and a number of non-reference well logs,
wherein the number of non-reference well logs, from second number of well logs, corresponds to a set of non-reference wellbores, and
wherein each of the number of non-reference well logs includes changes in the at least one formation property at a depth of each non-reference wellbore of the set of non-reference wellbores;
inputting the input tile into the neural network; and
in response to the inputting the input tile into the neural network,
outputting, from the neural network, a corresponding control point for each of the number of non-reference well logs that corresponds to the at least one control point of the reference well log; and
determining, based on the control point, that the formation property is substantially equivalent at the depth across the multiple well bores.

2. The method of claim 1, wherein predicting the depth alignment comprises aligning the reference well log and the number of non-reference well logs based on the at least one control point and the corresponding control point for each of the number of non-reference well logs that is output from the neural network.

3. The method of claim 2,
wherein the reference well log and each of the number of non-reference well logs comprises multiple channels, wherein each channel corresponds to a different formation property of the at least one formation property,
wherein defining the at least one control point comprises defining at least one control point for each channel in the reference well log, and wherein aligning comprises aligning, using the neural network, the at least one control point for each channel in the reference well log with a point in a corresponding channel of each of the number of non-reference well logs.

4. The method of claim 1, wherein predicting the depth alignment across the multiple wellbores comprises:
prior to inputting the reference well log and the non-reference well logs,
identifying null data in each of the non-reference well logs; and
transforming the null data into non-null data.

5. The method of claim 4, wherein transforming the null data into the non-null data comprises setting the null data to a same value.

6. The method of claim 5, wherein the same value is zero.

7. The method of claim 4, wherein transforming the null data into the non-null data comprises setting the null data to values according to a pseudo-random number pattern.

8. The method of claim 1, wherein the first number of well logs are based on actual well logging operations.

9. The method of claim 1, wherein the first number of well logs includes synthetic data.

10. One or more non-transitory machine-readable media comprising program code executable by a processor, the program code comprising:
instructions to train a neural network including
instructions to obtain a first number of well logs;
instructions to generate a training reference signal based on the first number of well logs;
instructions to transform the training reference signal to generate one or more transformed signals;
instructions to generate a training input tile and at least one control point mapping across each of the first number of well logs based on the training reference signal and the one or more transformed signals;
instructions to input, into the neural network, the training input tile and at least one control point for each of the first number of well logs;
instructions to input, into the neural network, the at least one control point mapping across each of the first number of well logs; and
instructions to train the neural network based on the training input tile and the at least one control point mapping across each of the first number of well logs;
instruction to predict a depth alignment across multiple wellbores based on at least one formation property of subsurface formations in which the multiple wellbores are located, wherein the predicting comprises
instructions to log the multiple wellbores to obtain wellbore data, wherein the wellbore data includes a second number of well logs of the at least one formation property for the corresponding multiple wellbores;
instructions to select a reference wellbore from among multiple wellbores and a corresponding reference well log from the second number of well logs;
instructions to define at least one control point in a reference signal of the reference well log for the reference wellbore, wherein the reference well log includes changes in at least one formation property at a depth of the reference wellbore;
instructions to generate an input tile that comprises the reference signal, the at least one control point, and a number of non-reference well logs,
wherein the number of non-reference well logs, from the second number of well logs, corresponds to a set of non-reference wellbores, and
wherein each of the number of non-reference well logs includes changes in the at least one formation property at a depth of each non-reference wellbore of the set of non-reference wellbores;
instructions to input the input tile into a machine-learning model; and
instructions to in response to input the input tile into the machine-learning model,
output, from the machine-learning model, a corresponding control point for each of the number of non-reference well logs that correspond to the at least one control point of the reference well log; and
instructions to determine, based on the control point, that the formation property is substantially equivalent at the depth across the multiple well bores.

11. The one or more non-transitory machine-readable media of claim 10,
wherein the program code comprises program code executable by the processor to cause the processor to:
align the reference well log and the number of non-reference well logs based on the at least one control point and the corresponding control point for each of the number of non-reference well logs that is output from the machine-learning model.

12. The one or more non-transitory machine-readable media of claim 10,
wherein the reference well log and each of the number of non-reference well logs comprises multiple channels, wherein each channel corresponds to a different formation property of the at least one formation property,
wherein the program code comprises program code executable by the processor to cause the processor to:
define at least one control point for each channel in the reference well log; and
align the at least one control point for each channel in the reference well log with a point in a corresponding channel of each of the number of non-reference well logs.

13. The one or more non-transitory machine-readable media of claim 10,
wherein the program code comprises program code executable by the processor to cause the processor to:
prior to inputting the reference well log and the non-reference well logs,
identify null data present in each of the non-reference well logs; and
transform the null data into non-null data.

14. The one or more non-transitory machine-readable media of claim 13, wherein the null data is transformed into the non-null data by setting the null data to a same value.

15. The one or more non-transitory machine-readable media of claim 13, wherein the null data is transformed into the non-null data by setting the null data to values according to a pseudo-random number pattern.

16. An apparatus comprising:
a processor; and
a machine-readable medium having program code executable by the processor to cause the processor to train an neural network for performing wellbore correlation across multiple wellbores, wherein the program code includes:

program code to log a wellbore to obtain wellbore data;

program code to generate a reference well log based on the wellbore data for the wellbore;

program code to define at least one reference control point for the reference well log;

program code to apply one or more transformations to the reference well log having the at least one reference control point defined to create a plurality of transformed well logs;

program code to create a training input tile that comprises the reference well log, the at least one reference control point for the reference well log, and the plurality of transformed well logs;

program code to create a training set that includes the training input tile and control point mapping among the at least one reference control point across each control point of the plurality of transformed well logs, wherein the control point mapping includes at least one corresponding control point for each transformed well log of the plurality of transformed well logs, wherein the at least one corresponding control point corresponds to the at least one reference control point;

program code to train the neural network using the training set; and program code to determine, via the neural network, that a formation property is substantially equivalent across multiple wellbores.

17. The apparatus of claim 16, wherein the program code executable by the processor to cause the processor to apply the one or more transformations to the reference well log comprises program code executable by the processor to cause the processor to:

apply at least one of shifting, compressing, stretching, an amplitude increase, an amplitude decrease, adding noise, and setting a value of at least a portion of data to null.

18. The apparatus of claim 16, wherein the program code executable by the processor to cause the processor to train the neural network using the training set comprises program code executable by the processor to cause the processor to:

output, from the neural network, a predicted mapping among the at least one reference control point across each of the plurality of transformed well logs,
  wherein the predicted mapping includes at least one predicted corresponding control point for each transformed well log of the plurality of transformed well logs,
  wherein each of the at least one predicted corresponding control point is associated with a probability,
  wherein the probability associated with each of the at least one predicted corresponding control point is based on the training input tile and the predicted mapping.

19. The apparatus of claim 16, wherein the reference well log comprises multiple channels, wherein each channel corresponds to a different formation property of a formation surrounding the wellbore, and wherein the program code executable by the processor to cause the processor to define the at least one reference control point for the reference well log comprises program code executable by the processor to cause the processor to,
  define at least one reference control point for each channel of the reference well log.

* * * * *